(12) United States Patent
Kondo et al.

(10) Patent No.: US 12,228,681 B2
(45) Date of Patent: Feb. 18, 2025

(54) RADAR DEVICE

(71) Applicant: DENSO CORPORATION, Kariya (JP)

(72) Inventors: Katsuhiko Kondo, Nisshin (JP);
Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 307 days.

(21) Appl. No.: 17/932,587

(22) Filed: Sep. 15, 2022

(65) Prior Publication Data

US 2023/0008853 A1 Jan. 12, 2023

Related U.S. Application Data

(63) Continuation of application No. PCT/JP2021/007097, filed on Feb. 25, 2021.

(30) Foreign Application Priority Data

Mar. 18, 2020 (JP) .................... 2020-047820

(51) Int. Cl.
| | | |
|---|---|---|
| G01S 7/40 | (2006.01) | |
| G01S 7/41 | (2006.01) | |
| G01S 13/93 | (2020.01) | |
| G01S 13/931 | (2020.01) | |

(52) U.S. Cl.
CPC ............. *G01S 7/4034* (2021.05); *G01S 7/40* (2013.01); *G01S 7/411* (2013.01); *G01S 13/931* (2013.01)

(58) Field of Classification Search
CPC .......... G01S 7/4034; G01S 7/40; G01S 7/411; G01S 13/931
See application file for complete search history.

(56) References Cited

U.S. PATENT DOCUMENTS

| | | | |
|---|---|---|---|
| 9,719,801 B1* | 8/2017 | Ferguson | G01C 21/3602 |
| 11,327,155 B2* | 5/2022 | Nemati | G01S 13/86 |
| 2011/0133915 A1 | 6/2011 | Ito | |
| 2016/0124076 A1* | 5/2016 | Nakatani | G01S 13/931 |
| | | | 342/174 |
| 2018/0113195 A1* | 4/2018 | Bialer | G01S 13/86 |

FOREIGN PATENT DOCUMENTS

| | | |
|---|---|---|
| JP | H02-246838 A | 10/1990 |
| JP | 2004-198159 A | 7/2004 |
| JP | 2019-066240 A | 4/2019 |

* cited by examiner

*Primary Examiner* — Bernarr E Gregory
*Assistant Examiner* — Juliana Cross
(74) *Attorney, Agent, or Firm* — Maschoff Brennan

(57) ABSTRACT

An axis deviation angle estimation device estimates a vertical axis deviation angle of a radar device based on roadside object information including information on a plurality of reflection points on a roadside object and road surface information including information on a plurality of reflection points on a road surface. The vertical axis deviation angle is an angle of deviation of an actual mounting direction from a reference mounting direction in a vertical direction. The actual mounting direction is an actual direction of the radar device, and the reference mounting direction is a direction of the radar device when the radar device is mounted in a reference state.

9 Claims, 18 Drawing Sheets

FIG.11
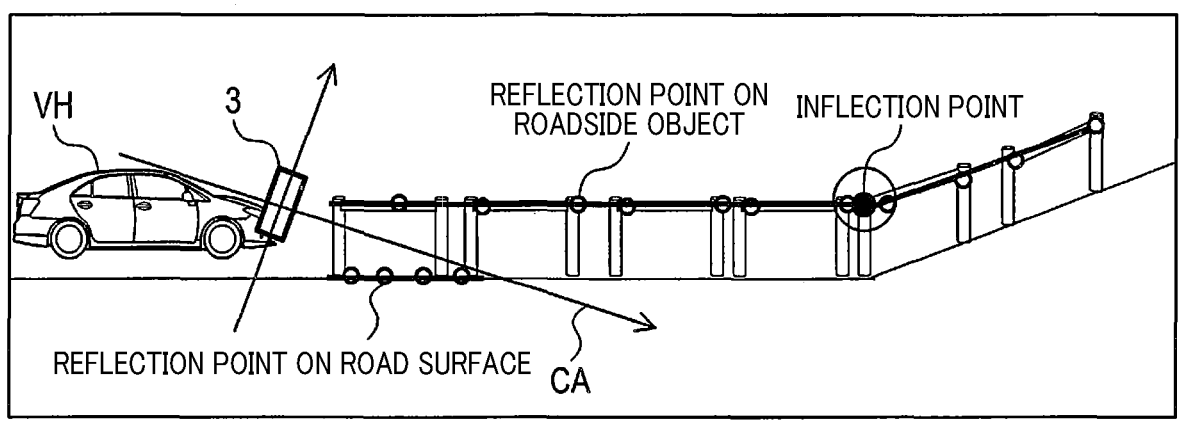
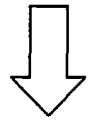
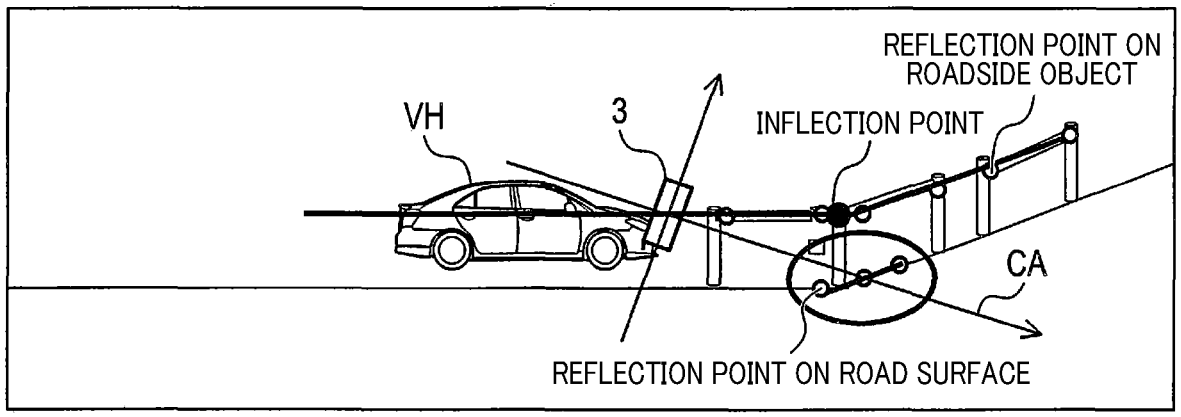

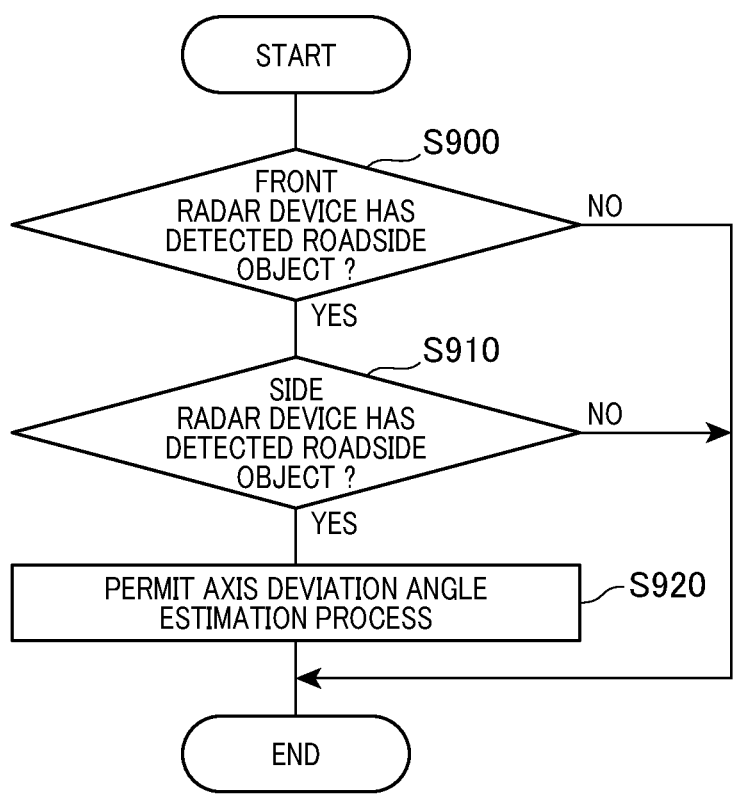

RADAR DEVICE

CROSS-REFERENCE TO RELATED APPLICATION

The present application is a continuation application of International Application No. PCT/JP2021/007097, filed on Feb. 25, 2021, which claims priority to Japanese Patent Application No. 2020-047820, filed in Japan on Mar. 18, 2020, now Japanese patent No. 7,477,329. The contents of these applications are incorporated herein by reference in their entirety.

BACKGROUND

1. Technical Field

The present disclosure relates to a technique for estimating an axis deviation of a radar device.

2. Related Art

In conventional in-vehicle radar devices, for example, a change in the mounting condition of a radar device due to some cause may lead to a deviation of the center axis of a radar beam, that is, an axis deviation of the radar beam. Such an axis deviation reduces the accuracy in detection of an object to be detected by the radar device.

SUMMARY

The present disclosure provides a radar device including an axis deviation estimation device. As one aspect of the present disclosure, an axis deviation estimation device includes at least an object information acquisition unit, a roadside object extraction unit, a road surface extraction unit, and an axis deviation angle estimation unit.

The object information acquisition unit is configured to repeatedly acquire object information including an object distance and an object azimuth angle. The object distance is a distance between the radar device and a reflection object corresponding to a reflection point of a radar wave that is detected by the radar device, and the object azimuth angle is an azimuth angle at which the reflection object is located.

The roadside object extraction unit is configured to extract roadside object information on a roadside object from the object information. Specifically, the roadside object extraction unit is configured to extract the roadside object information from the object information based on a predetermined extraction condition. The roadside object information is information on the reflection point on a roadside object provided in accordance with a predetermined condition on a side of a travel path at a higher position than the travel path in a direction in which the travel path extends. The travel path is a path in which the moving object travels.

The road surface extraction unit is configured to extract road surface information from the object information based on a predetermined extraction condition. The road surface information is information on the reflection point on a road surface of the travel path in which the moving object travels.

The axis deviation angle estimation unit is configured to estimate a vertical axis deviation angle based on the roadside object information including information on a plurality of the reflection points on the roadside object and the road surface information including information on a plurality of the reflection points on the road surface. The vertical axis deviation angle is an angle of deviation of an actual mounting direction from a reference mounting direction in a vertical direction. The actual mounting direction is an actual direction of the radar device, and the reference mounting direction is a direction of the radar device when the radar device is mounted in a reference state.

BRIEF DESCRIPTION OF THE DRAWINGS

In the accompanying drawings:

FIG. 8 is an explanatory diagram showing an arrangement of the guardrail and reflection points on the guardrail in the vertical direction, and the like;

FIG. 10 is an explanatory diagram showing an arrangement of reflection points on a road surface in the vertical direction, and the like;

FIG. 11 is an explanatory diagram showing an arrangement of reflection points on a road surface with a gradient, and the like;

FIG. 20 is a flow chart showing a process in a second embodiment and the like;

FIG. 22 is a flow chart showing a process in a fifth embodiment.

DETAILED DESCRIPTION OF THE PREFERRED EMBODIMENTS

Figure 1:
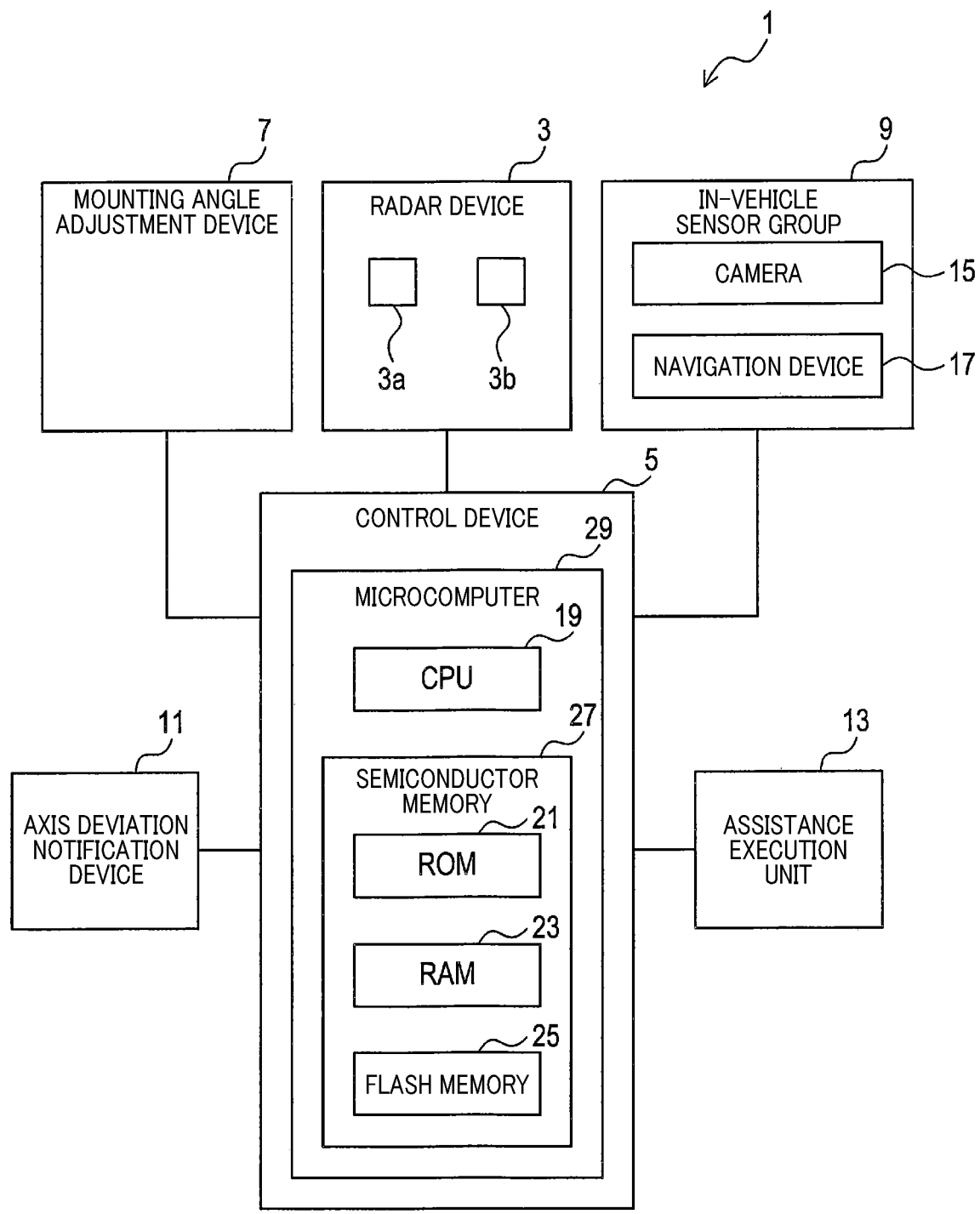
FIG. 1 is a block diagram showing a vehicle control system including an axis deviation estimation device of a first embodiment.

For example, JP 6321448 B discloses a technique for estimating an angle of axis deviation of a radar device in a vertical direction (i.e., vertical axis deviation) using a phenomenon in which the reception intensity of a reflected wave from a road surface near the vehicle is maximum.

As a result of detailed studies on the technique described above, the inventor has found the following improvement point.

The technique described above uses the reception intensity of a reflected wave from the road surface to estimate the angle of vertical axis deviation (i.e., vertical axis deviation angle). Thus, it is not easy to accurately estimate the vertical axis deviation angle when the gradient of the road surface is changed.

That is, a vertical axis deviation causes a change in the reception intensity of a reflected wave, and a change in the gradient of the road surface also causes a change in the reception intensity of a reflected wave. Thus, in such a case, it is not easy to detect a vertical axis deviation based on the reflected wave from the road surface.

One or more aspects of the present disclosure preferably provides a technique for accurately estimating a vertical axis deviation angle of a radar device.

An axis deviation estimation device of an aspect of the present disclosure relates to an axis deviation estimation device for estimating an axis deviation of a radar device when the radar device is mounted on a moving object.

The axis deviation estimation device includes an object information acquisition unit, a roadside object extraction unit, a road surface extraction unit, and an axis deviation angle estimation unit.

The object information acquisition unit is configured to repeatedly acquire object information including an object distance and an object azimuth angle. The object distance is a distance between the radar device and a reflection object corresponding to a reflection point of a radar wave that is detected by the radar device, and the object azimuth angle is an azimuth angle at which the reflection object is located.

The roadside object extraction unit is configured to extract roadside object information on a roadside object from the object information. Specifically, the roadside object extraction unit is configured to extract the roadside object information from the object information based on a predetermined extraction condition. The roadside object information is information on the reflection point on a roadside object provided in accordance with a predetermined condition on a side of a travel path at a higher position than the travel path in a direction in which the travel path extends. The travel path is a path in which the moving object travels.

The road surface extraction unit is configured to extract road surface information from the object information based on a predetermined extraction condition. The road surface information is information on the reflection point on a road surface of the travel path in which the moving object travels.

The axis deviation angle estimation unit is configured to estimate a vertical axis deviation angle based on the roadside object information including information on a plurality of the reflection points on the roadside object and the road surface information including information on a plurality of the reflection points on the road surface. The vertical axis deviation angle is an angle of deviation of an actual mounting direction from a reference mounting direction in a vertical direction. The actual mounting direction is an actual direction of the radar device, and the reference mounting direction is a direction of the radar device when the radar device is mounted in a reference state.

In an aspect of the present disclosure, the above configuration makes it possible to easily extract, from object information on a reflection object obtained by driving the radar device, roadside object information such as a position of a roadside object provided along a travel path. The roadside object is provided in accordance with a predetermined condition along the travel path on the side of the travel path at a higher position than a road surface of the travel path. Thus, a reflected wave from the roadside object is more easily detected than a reflected wave from the road surface. Accordingly, the state of the roadside object such as the position of the roadside object can be easily determined from the roadside object information.

Thus, for example, the gradient of the road surface of the travel path can be estimated based on the roadside object information indicating a change in height (i.e., gradient) of the roadside object. For example, when a portion of the roadside object that is located farther from the radar device is located at a higher position, it can be assumed that a portion of the road surface that is located farther from the radar device is also located at a higher position (i.e., the road is uphill).

Thus, for example, when a vertical axis deviation of the radar device is estimated based on the road surface information, the state of the road surface such as the gradient of the road surface can be estimated based on the roadside object information obtained by using a reflected wave from the roadside object having the characteristics described above.

That is, when the road surface has a gradient, the reception of a radar wave is changed according to the gradient of the road surface and the like. In an aspect of the present disclosure, the gradient of the road surface and the like can be determined based on the roadside object information. Thus, by estimating the vertical axis deviation based on the roadside object information having the characteristics described above and the road surface information, it is possible to more accurately estimate the vertical axis deviation than when the vertical axis deviation is estimated merely using the road surface information.

Furthermore, by estimating the vertical axis deviation based on the roadside object information and the road surface information, it is possible to more stably estimate the vertical axis deviation, improving the robustness.

Embodiments of the present disclosure will be described below with reference to the drawings.

1. First Embodiment 1-1. General Configuration

First, a general configuration of a vehicle control system including an axis deviation estimation device of a first embodiment will be described.

A vehicle control system 1 shown in FIG. 1 is a system to be mounted on a vehicle VH which is a moving object. The vehicle control system 1 includes a radar device 3 and a control device 5 as main components. The vehicle control system 1 may further include a mounting angle adjustment device 7, an in-vehicle sensor group 9, an axis deviation notification device 11, and an assistance execution unit 13. Hereinafter, the vehicle VH on which the vehicle control system 1 is mounted is also referred to as the own vehicle VH. Furthermore, a vehicle width direction of the own vehicle VH is also referred to as a horizontal direction, and a vehicle height direction of the own vehicle VH is also referred to as a vertical direction.

Figure 2:
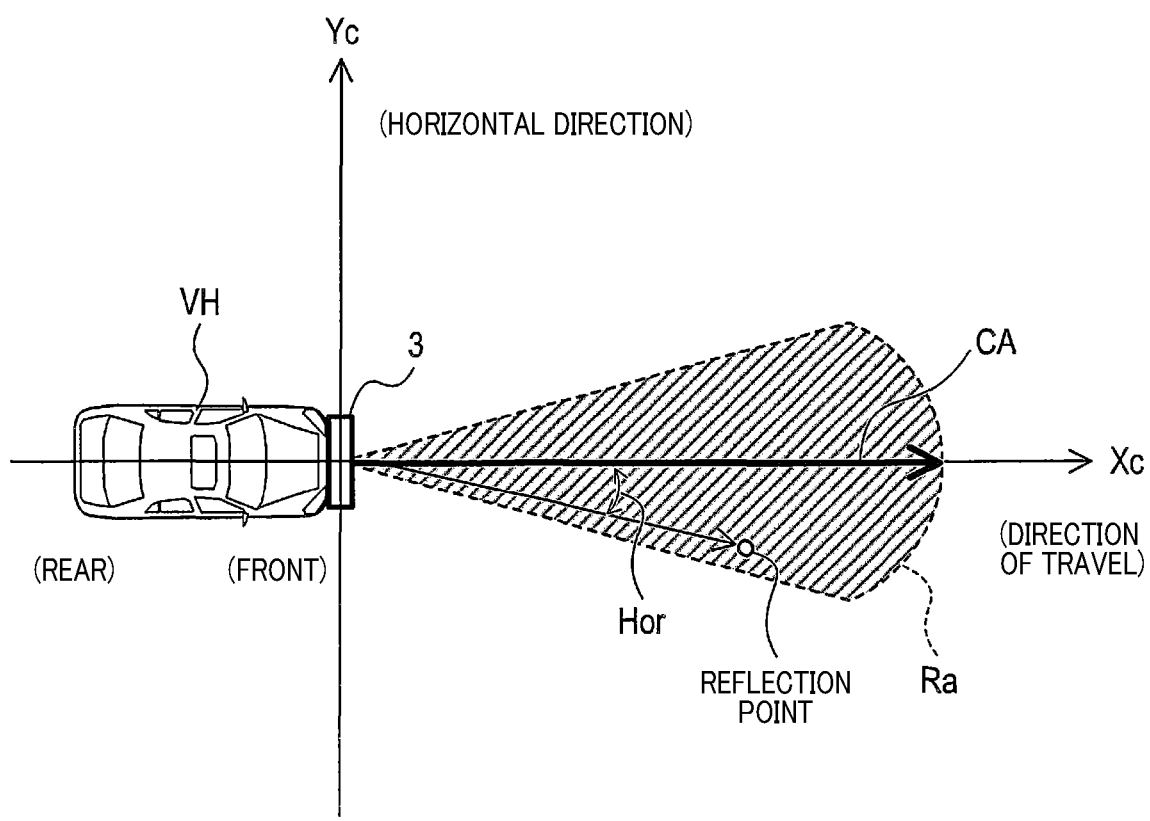
FIG. 2 is an explanatory diagram showing a region irradiated with a radar wave in a horizontal direction.
Figure 3:
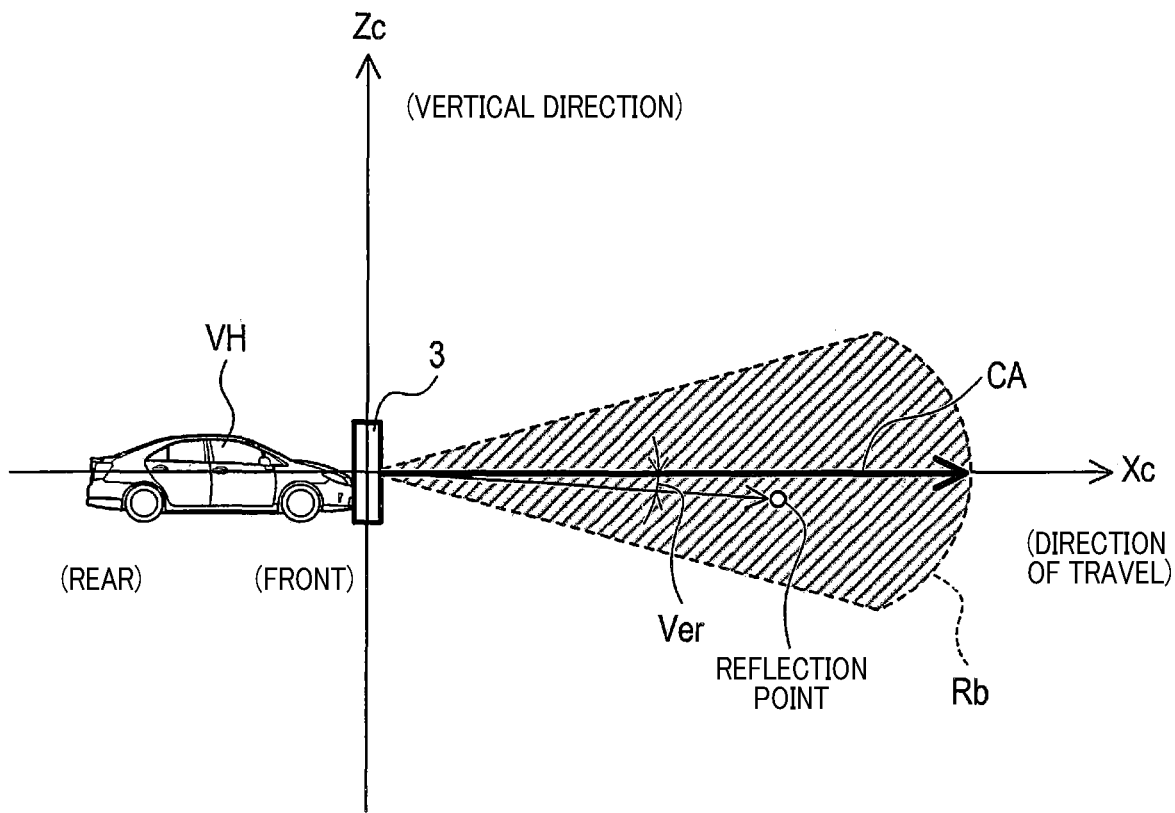
FIG. 3 is an explanatory diagram showing a region irradiated with a radar wave in a vertical direction.

As shown in FIGS. 2 and 3, the radar device 3 is arranged at the front of the own vehicle VH, and emits a radar wave in a forward direction (i.e., direction of travel) of the own vehicle VH. Specifically, the radar device 3 irradiates, with a radar wave, a predetermined angle region Ra in the horizontal direction in front of the own vehicle VH and a predetermined angle region Rb in the vertical direction in front of the own vehicle VH. The radar device 3 receives a reflected wave of the emitted radar wave, and generates reflection point information (i.e., object information) on a reflection point (i.e., reflection object) at which the radar wave is reflected.

The radar device 3 may be a millimeter-wave radar that uses an electromagnetic wave in a millimeter-wave band as a radar wave, a laser radar that uses a laser beam as a radar wave, or a sonar that uses a sound wave as a radar wave. In any case, in the radar device 3, an antenna unit for transmitting and receiving a radar wave is configured to be able to detect the arrival direction of a reflected wave both in the horizontal direction and in the vertical direction. The antenna unit may include array antennas arranged in the horizontal direction and the vertical direction.

The radar device 3 is mounted on the own vehicle VH so that a beam direction of a beam of a radar wave (i.e., radar beam) emitted from the radar device 3 coincides with the forward direction in the longitudinal direction of the own vehicle VH, that is, the direction of travel of the own vehicle VH. The radar device 3 is used to detect various objects (i.e., targets) that are present in front of the own vehicle VH. The beam direction is a direction along a center axis CA of a radar beam. When the radar device 3 is placed at a proper position (i.e., reference position), the beam direction usually coincides with the direction of travel of the own vehicle VH.

The reflection point information generated by the radar device 3 includes at least an azimuth angle of the reflection point, and a distance to the reflection point (i.e., a distance between the radar device 3 and the reflection point). The radar device 3 may be configured to detect a relative speed of the reflection point to the own vehicle VH and a reception intensity (i.e., reception power) of a reflected wave of the radar wave reflected at the reflection point. The reflection point information may include the relative speed of the reflection point and the reception intensity.

As shown in FIGS. 2 and 3, the azimuth angle of the reflection point is an angle obtained by using as a reference the beam direction which is a direction along the center axis CA of the radar beam. Specifically, the azimuth angle of the reflection point is at least one of an angle in the horizontal direction (hereinafter referred to as horizontal angle) Hor at which the reflection point is located and an angle in the vertical direction (hereinafter referred to as vertical angle) Ver at which the reflection point is located. In this case, the reflection point information includes both the vertical angle Ver and the horizontal angle Hor as information indicating the azimuth angle of the reflection point.

The radar device 3 is, for example, an FMCW radar device. The radar device 3 alternately transmits a radar wave in an ascending modulation section and a radar wave in a descending modulation section with a modulation period set in advance, and receives a reflected radar wave. FMCW is an abbreviation for Frequency Modulated Continuous Wave.

For each modulation period, the radar device 3 detects, as the reflection point information, the horizontal angle Hor and the vertical angle Ver which are the azimuth angles of the reflection point, the distance to the reflection point, the relative speed to the reflection point, and the reception intensity of the received radar wave as described above.

The mounting angle adjustment device 7 includes a motor, and a gear attached to the radar device 3. The mounting angle adjustment device 7 rotates the motor based on a driving signal output from the control device 5. This causes a rotational force of the motor to be transmitted to the gear, allowing the radar device 3 to be rotated about a horizontal axis along the horizontal direction and a vertical axis along the vertical direction.

Thus, for example, by rotating the radar device 3 about the horizontal axis in the direction of arrow A (see FIG. 5, for example) along a vertical plane, an angle of deviation of the radar device 3 in the vertical direction can be adjusted.

The in-vehicle sensor group 9 is at least one sensor mounted on the own vehicle VH to detect a state of the own vehicle VH and the like. The in-vehicle sensor group 9 may include a vehicle speed sensor. The vehicle speed sensor is a sensor that detects a speed of the vehicle based on rotation of a wheel. Furthermore, as shown in FIG. 1, the in-vehicle sensor group 9 may include, for example, a camera 15 such as a CCD camera. The camera 15 captures an image of the same region as the region irradiated with a radar wave from the radar device 3.

Furthermore, the in-vehicle sensor group 9 may include an acceleration sensor. The acceleration sensor detects an acceleration of the own vehicle VH. Furthermore, the in-vehicle sensor group 9 may include a yaw rate sensor. The yaw rate sensor detects a rate of change in yaw angle indicating an inclination of the direction of travel of the own vehicle VH with respect to the forward direction of the own vehicle VH. Furthermore, the in-vehicle sensor group 9 may include a steering angle sensor. The steering angle sensor detects a steering angle of a steering wheel.

Furthermore, the in-vehicle sensor group 9 may include a navigation device 17 including map information. The navigation device 17 may be configured to detect a position of the own vehicle VH based on a GPS signal or the like and associate the position of the own vehicle VH with the map information. The map information may include, as various types of information on a road, for example, information on a position at which a vehicle protective fence (hereinafter referred to as guardrail) 41 (see FIG. 7, for example) is provided as a roadside object.

The axis deviation notification device 11 is a voice output device provided in a cabin of the vehicle, and outputs a warning sound to an occupant of the own vehicle VH. The axis deviation notification device 11 may be, for example, an audio device of the assistance execution unit 13.

The assistance execution unit 13 performs a predetermined driving assistance by controlling various in-vehicle devices based on a result of an object detection process (described later) performed by the control device 5. The various in-vehicle devices to be controlled may include a monitor that displays an image, and an audio device that outputs an alarm sound and a guidance voice. Furthermore, a control device that controls an internal combustion engine, a power train mechanism, a brake mechanism, and the like of the own vehicle VH may be included.

The control device 5 includes a microcomputer 29 including a CPU 19, and a semiconductor memory (hereinafter referred to as memory) 27 including a ROM 21, a RAM 23, a flash memory 25, and the like. The CPU 19 executes a program stored in a non-transitory tangible storage medium to implement various functions of the control device 5. In this example, the memory 27 corresponds to the non-transitory tangible storage medium storing a program. When the program is executed, a method corresponding to the program is performed; thus, functions is realized. The control device 5 may include a single microcomputer 29, or may include a plurality of microcomputers 29.

Figure 4:
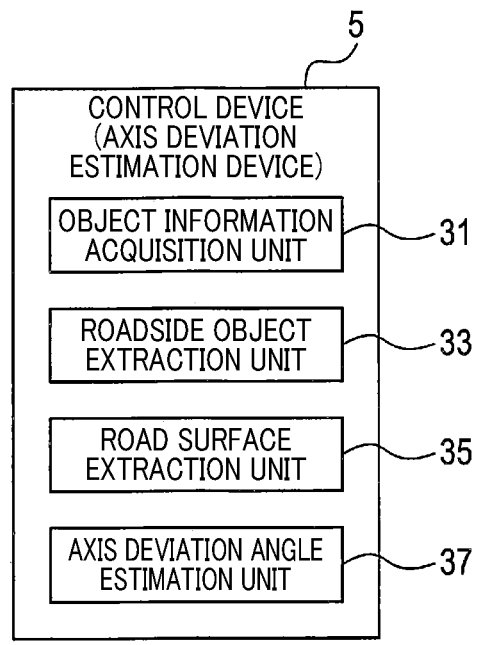
FIG. 4 is a block diagram functionally showing the axis deviation estimation device of the first embodiment.

As shown in FIG. 4, the control device 5 has the functions of an object information acquisition unit 31, a roadside object extraction unit 33, a road surface extraction unit 35, and an axis deviation angle estimation unit 37, and serves as an axis deviation estimation device.

The object information acquisition unit 31 repeatedly acquires reflection point information (i.e., object information) including an azimuth angle of a reflection point (i.e., object azimuth angle) and a distance to the reflection point (i.e., object distance).

The roadside object extraction unit 33 extracts roadside object information from the reflection point information based on a predetermined extraction condition (described later). The roadside object information is information on a reflection point on a roadside object (e.g., the guardrail 41) provided in accordance with a predetermined condition (e.g., provided at a constant height) on the side of a road (i.e., lane) on which the vehicle VH travels, at a higher position than a road surface of the road in a direction in which the road extends. The roadside object information includes, for example, information on a position of the reflection point at which a radar wave is reflected from the roadside object. A reflection point on a roadside object may be referred to as a roadside object reflection point.

The road surface extraction unit 35 extracts road surface information from the reflection point information based on a predetermined extraction condition. The road surface information is information on a reflection point on the road surface of the road on which the vehicle VH travels. The road surface information includes, for example, information on a position of a reflection point at which a radar wave is reflected from the road surface. A reflection point on a road surface may be referred to as a road surface reflection point.

The axis deviation angle estimation unit 37 estimates a vertical axis deviation angle from the roadside object information and the road surface information. Specifically, the axis deviation angle estimation unit 37 estimates a vertical axis deviation angle from the roadside object information including information on a plurality of reflection points and the road surface information including information on a plurality of reflection points. The vertical axis deviation angle is an angle of deviation of an actual mounting direction from a reference mounting direction in the vertical direction. The actual mounting direction is an actual direction of the radar device 3, and the reference mounting direction is a direction of the radar device 3 when the radar device 3 is mounted in a reference state (i.e., at a reference position).

In this case, the reference mounting direction is a direction of the radar device 3 when the radar device 3 is placed at the reference position, which is an intended mounting position (i.e., position set in advance) at which the radar device 3 is to be mounted. In the first embodiment, the reference mounting direction coincides with, for example, a direction of the X-axis (i.e., Xc) shown in FIGS. 2 and 3, and no axis deviation of the radar device 3 occurs when the radar device 3 is mounted at the reference position. The direction (i.e., reference direction) of the radar device 3 is the front direction of the radar device 3, and the reference mounting direction is the front direction of the vehicle VH.

1-2. Axis Deviation of Radar Device

Next, an axis deviation of the radar device 3 will be described.

An axis deviation of the radar device 3 refers to a deviation of a coordinate axis of the radar device 3 when the radar device 3 is actually mounted on the own vehicle VH from a coordinate axis of the radar device 3 when the radar device 3 is properly mounted on the own vehicle VH.

Axis deviations of the radar device 3 include axis deviations of the radar device 3 around a device coordinate axis and axis deviations of the radar device 3 in the height direction. Of the axis deviations of the radar device 3 around the device coordinate axis, a vertical axis deviation will be mainly described here.

(a) Coordinate Axes

First, coordinate axes of the radar device 3 and coordinate axes of the own vehicle VH will be described.

Figure 5:
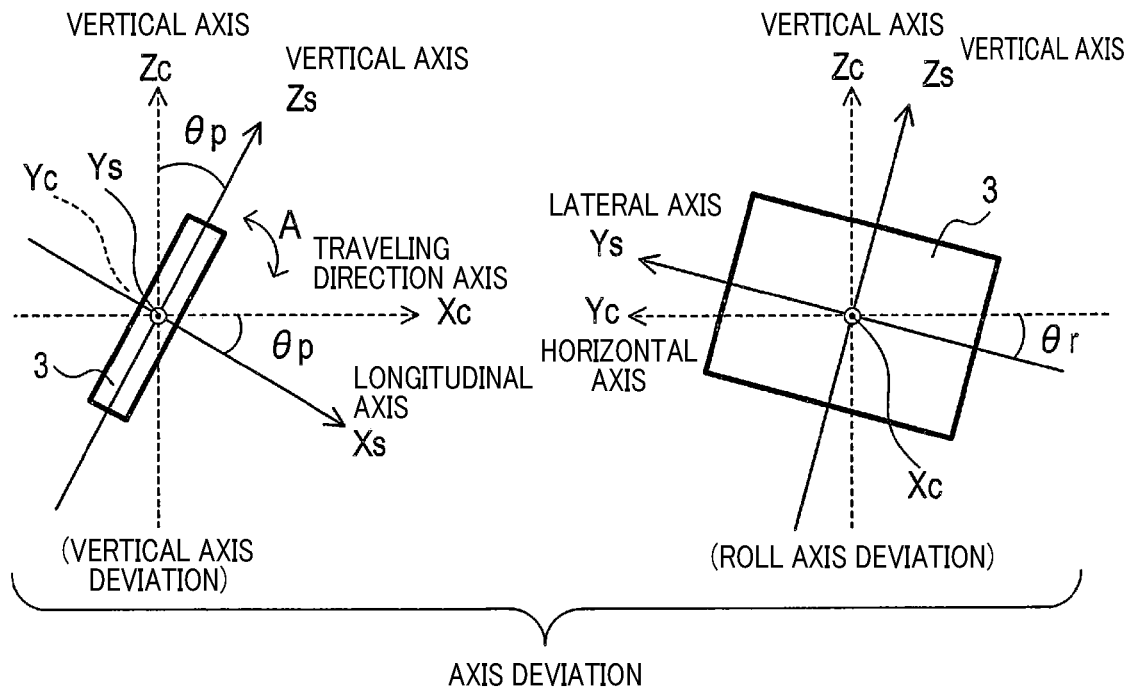
FIG. 5 is an explanatory diagram showing a vertical axis deviation angle and a roll angle.

As shown in FIG. 5, the coordinate axes of the radar device 3 refer to a vertical axis Zs vertically extending from the radar device 3, a lateral axis Ys laterally extending from the radar device 3, and a longitudinal axis Xs longitudinally extending from the radar device 3, when the radar device 3 is mounted on the own vehicle VH. The vertical axis Zs, the lateral axis Ys, and the longitudinal axis Xs are perpendicular to each other. In the first embodiment, in which the radar device 3 is placed at the front of the own vehicle VH, the longitudinal axis Xs coincides with the center axis CA of a radar beam. That is, the direction of the radar device 3 coincides with the direction of the longitudinal axis Xs.

The vertical axis Zs, the lateral axis Ys, and the longitudinal axis Xs constitute coordinates of the radar device 3 (i.e., device coordinates).

On the other hand, the coordinate axes of the own vehicle VH refer to a vertical axis Zc extending in the vertical direction, a horizontal axis Yc extending in the horizontal direction, and a traveling direction axis Xc extending in the direction of travel of the own vehicle VH. The vertical axis Zc, the horizontal axis Yc, and the traveling direction axis Xc are perpendicular to each other.

The vertical axis Zc, the horizontal axis Yc, and the traveling direction axis Xc constitute coordinates of the own vehicle VH (i.e., vehicle coordinates).

In the first embodiment, as described above, when the radar device 3 is properly mounted on the own vehicle VH, the direction of the center axis CA coincides with the direction of travel of the own vehicle VH. That is, the directions of the coordinate axes of the radar device 3 coincide with the respective directions of the coordinate axes of the own vehicle VH. For example, in the own vehicle VH in an initial state such as in the own vehicle VH when shipped from the factory, the radar device 3 is properly mounted on the own vehicle VH, that is, the radar device 3 is mounted at a predetermined position.

(b) Axis Deviation Around Device Coordinate Axis

Next, an axis deviation of the radar device 3 around the device coordinate axis will be described.

In the own vehicle VH after the initial state, an axis deviation of the radar device 3 around the device coordinate axis may occur. Such axis deviations include a vertical axis deviation and a roll axis deviation. An axis deviation angle is an angle indicating the magnitude of such an axis deviation.

Of these, as shown on the left side of FIG. 5, a vertical axis deviation refers to a deviation between the vertical axis Zs as the coordinate axis of the radar device 3 and the vertical axis Zc as the coordinate axis of the own vehicle VH. An axis deviation angle of such vertical axis deviation is referred to as a vertical axis deviation angle $\theta p$. The vertical axis deviation angle $\theta p$ is a pitch angle $\theta p$, and is an axis deviation angle of deviation of the coordinate axis of the radar device 3 around the horizontal axis Yc of the own vehicle VH. Thus, the vertical axis deviation angle $\theta p$ is an axis deviation angle of axis deviation around the horizontal axis Yc of the own vehicle VH, that is, around the lateral axis Ys of the radar device 3.

As is clear from the left side of FIG. 5, the vertical axis deviation angle θp can also be an angle indicating the magnitude of a deviation between the longitudinal axis Xs as the coordinate axis of the radar device 3 and the traveling direction axis Xc as the coordinate axis of the own vehicle VH.

The vertical axis deviation angle will be described below in more detail with reference to FIG. 6.

Figure 6:
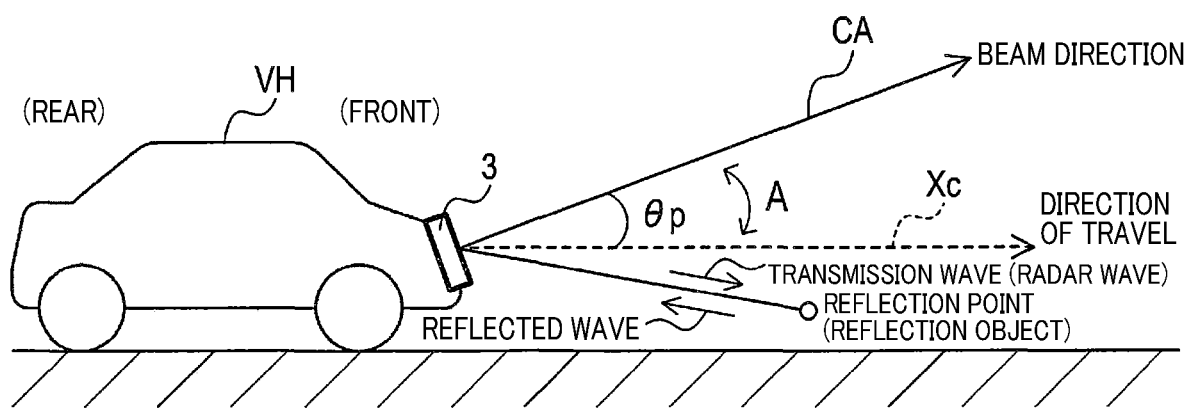
FIG. 6 is an explanatory diagram showing an axis deviation of a radar device.

FIG. 6 shows an axis deviation (i.e., an axis deviation in the vertical direction) of a radar beam of the radar device 3 in a Z-X plane which is a vertical plane passing through the traveling direction axis Xc. When there is no axis deviation, the center axis CA of the radar beam coincides with the traveling direction axis Xc.

As shown in FIG. 6, the vertical axis deviation angle θp is an angle in the vertical direction between the direction of travel of the vehicle VH and the beam direction when the reference mounting direction of the radar device 3 coincides with the direction of travel of the vehicle VH, and the actual mounting direction of the radar device 3, which is the actual direction of the radar device 3, is the beam direction.

That is, the vertical axis deviation angle θp is an angle of deviation of the center axis CA of the radar beam of the radar device 3 from the direction of travel as a reference to the actual beam direction shown in FIG. 6 that is caused, for example, by rotation of the radar device 3 in the direction of arrow A.

As shown on the right side of FIG. 5, a roll axis deviation refers to a deviation between the lateral axis Ys as the coordinate axis of the radar device 3 and the horizontal axis Yc as the coordinate axis of the own vehicle VH. An axis deviation angle of such roll axis deviation is referred to as a roll angle Or.

1-3. Principle of Estimation of Vertical Axis Deviation Angle

<Estimation of Vertical Axis Deviation Angle Using Roadside Object>

First, a principle of estimation of the vertical axis deviation angle using a roadside object will be described.

Figure 7:
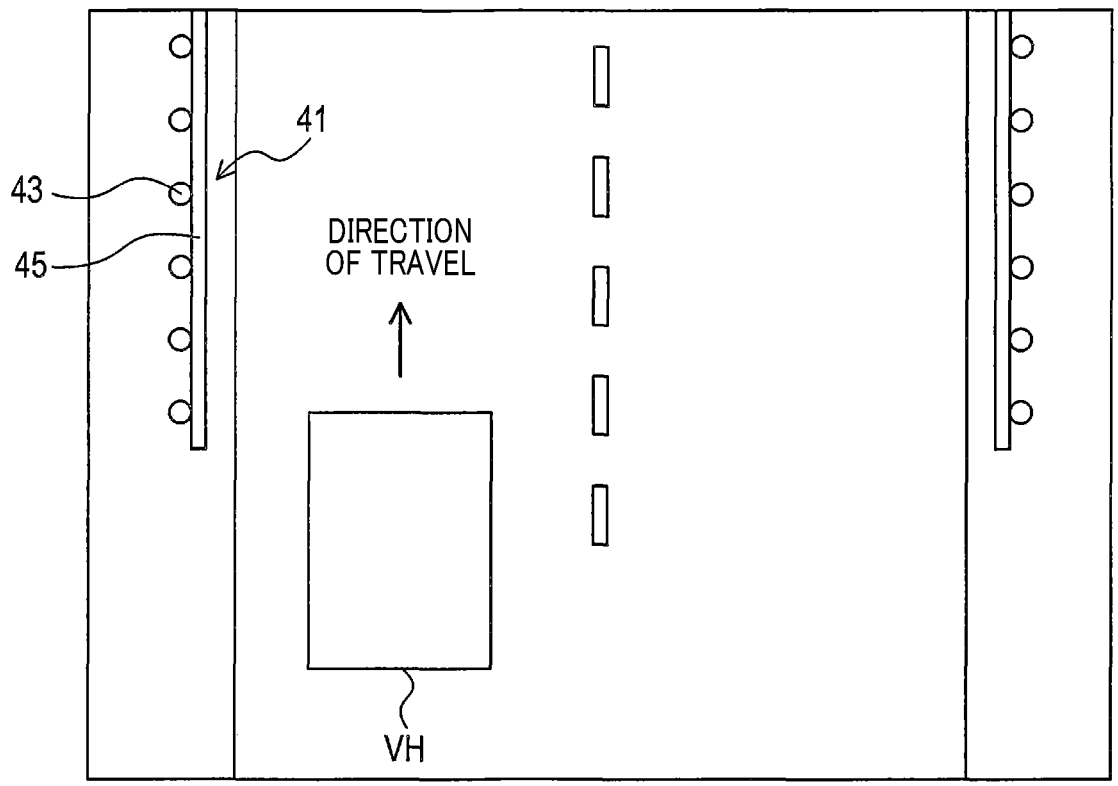
FIG. 7 is an explanatory diagram showing an arrangement of a guardrail and the like on a road in a plane.
Figure 8:
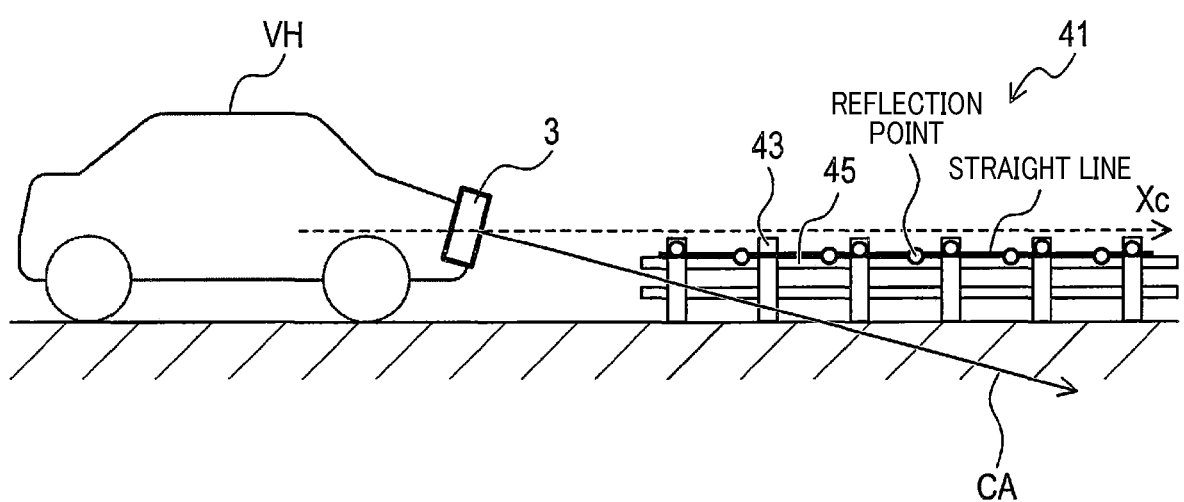

(a) For example, as shown in FIGS. 7 and 8, an example will be described in which the guardrail 41 is provided as a roadside object on the side of a road in a width direction of the road so as to protrude upward from the road surface in a direction in which the road extends. The lateral direction in FIG. 7 indicates the width direction of the road, and the vertical direction in FIG. 7 indicates the direction in which the road extends, that is, the direction in which the vehicle VH travels.

In such a case, as shown in FIG. 8, the guardrail 41 is usually provided at a constant height in the direction in which the road extends. Specifically, on the road surface, a plurality of poles 43 are arranged in a line in the direction in which the road extends, and a bar-shaped or plate-shaped lateral member 45 is fixed to laterally connect the poles 43 (e.g., adjacent poles 43).

That is, the poles 43 and the lateral member 45 are usually provided at a constant height; thus, the upper end of the guardrail 41 extends substantially horizontally along the road. The entire guardrail 41 on the road surface also extends substantially horizontally in a strip shape (i.e., with a predetermined vertical width) in the vertical plane.

Thus, when a radar beam is emitted forward from the radar device 3 of the vehicle VH, the radar beam is reflected from the road surface or the guardrail 41, and a reflected wave of the radar beam is received by the radar device 3. Then, based on the reflected wave, the road surface or the guardrail 41 is detected as a reflection point (i.e., reflection object).

When a radar beam is actually emitted from the radar device 3 to the guardrail 41 and a reflected wave of the radar beam is examined, a reflected wave from the upper ends of the poles 43 and the upper end of the lateral member 45 has a high intensity, and this makes it possible to easily detect a reflection point at the upper ends of the poles 43 and the upper end of the lateral member 45. Furthermore, a reflection point can also be detected at a portion of the guardrail 41 other than the upper ends of the poles 43 and the upper end of the lateral member 45.

Thus, when the guardrail 41 is provided along the road, a large number of reflection points corresponding to the guardrail 41 are detected in a strip-shaped region in the direction of travel of the vehicle VH. In particular, reflection points corresponding to the upper ends of the poles 43 and the upper end of the lateral member 45 are detected in a substantially linear region having a small width.

As described in detail later, therefore, the arrangement of a large number of reflection points (i.e., reflection point group) corresponding to the guardrail 41 that are detected in the strip-shaped region makes it possible to determine a slope of the reflection point group when there is a vertical axis deviation.

In FIG. 8, for easy understanding, the arrangement of the reflection point group is indicated by the straight line connecting the reflection points at the upper ends of the poles 43 and the upper end of the lateral member 45.

(b) Next, a relationship between the vertical axis deviation angle θp and a reflection point group will be described with reference to FIG. 9.

Figure 9:
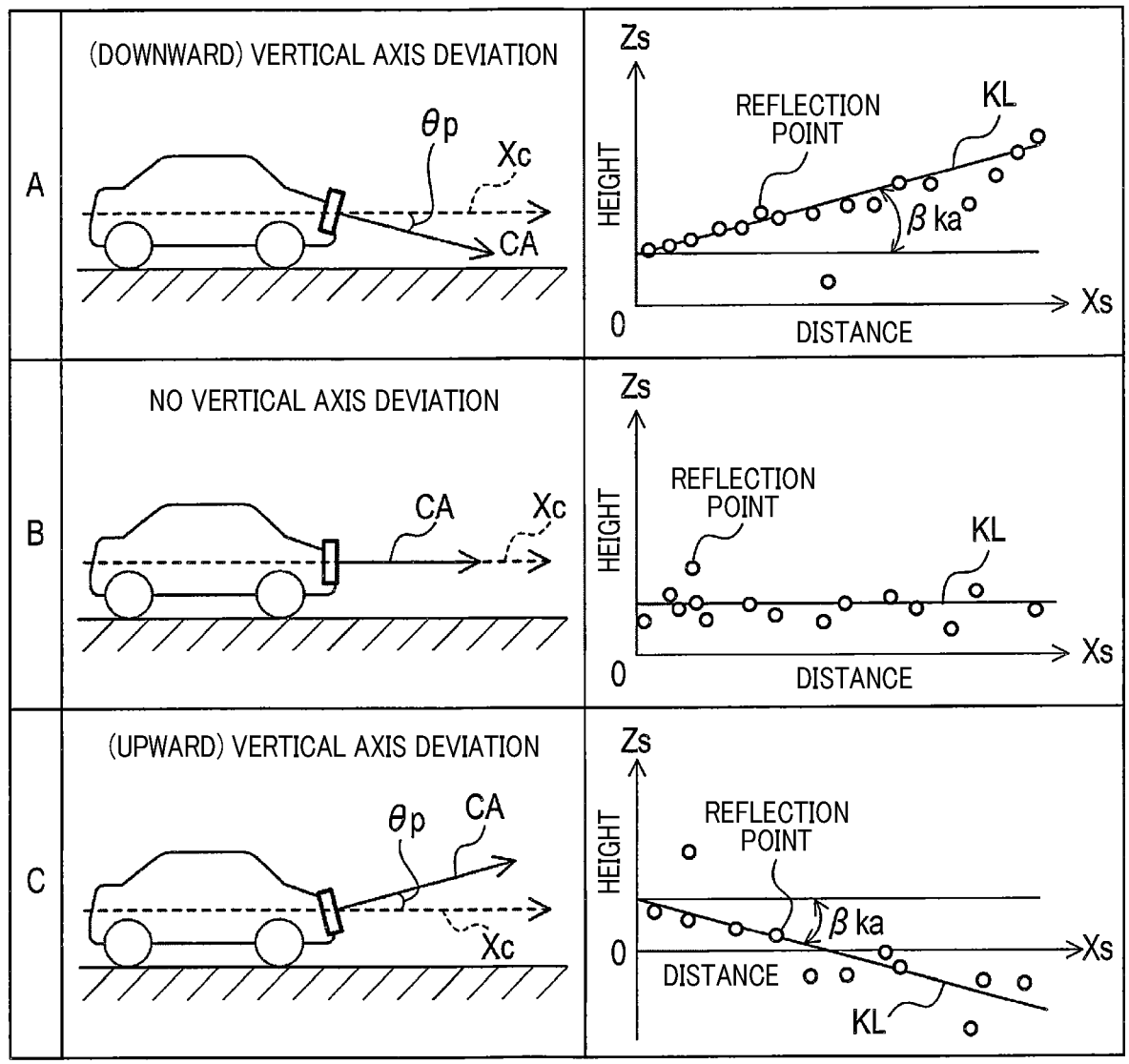
FIG. 9 is an explanatory diagram showing relationships between the vertical axis deviation angle, an arrangement of reflection points, and an approximate straight line.

As shown in FIG. 9 (B), when there is no vertical axis deviation of the radar device 3 (i.e., when the center axis CA is horizontal), as shown in the graph on the right side of FIG. 9 (B), a plurality of reflection points detected by the radar device 3 are arranged substantially horizontally in the vertical plane.

The graphs on the right side of FIG. 9 show positions of reflection points obtained by projecting reflection points in the three-dimensional device coordinates along the lateral axis Ys onto the Z-X plane (i.e., positions of projected reflection points). The straight line in each of the graphs is an approximate straight line KL (i.e., roadside object straight line) obtained by approximating the plurality of projected reflection points using a least-squares method. Hereinafter, a projected reflection point may be simply referred to as a reflection point.

Thus, when a result of detection by the radar device 3 indicates that the approximate straight line KL is horizontal as shown in the graph on the right side of FIG. 9 (B), it can be determined that there is no vertical axis deviation.

However, if, as shown in FIG. 9 (A), the center axis CA of the radar beam of the radar device 3 (i.e., the direction of the radar device 3) is deviated downward, a portion of the center axis CA of the radar beam that is located farther from the radar device 3 in the traveling direction Xc is located farther from the upper ends of the poles 43.

FIG. 8 shows that when the center axis CA of the radar beam is deviated downward from the traveling direction axis Xc, a distance between the center axis CA and the upper end of the guardrail 41 is increased in a direction away from the radar device 3 toward the right side of FIG. 8.

Thus, as shown in the graph on the right side of FIG. 9 (A), in the arrangement of the plurality of reflection points, a reflection point located farther from the radar device 3 and closer to the right side of FIG. 9 (A) is located at a higher position; thus, a slope βa of the approximate straight line KL has a positive value. As the absolute value of the slope βa of the approximate straight line KL is increased, the absolute value of the vertical axis deviation angle θp of downward deviation of the radar device 3 is increased. That is, as is clear from FIG. 9 (A) and the like, an angle corresponding to the slope βa of the approximate straight line KL (i.e., slope angle βka) and the vertical axis deviation angle θp of the radar device 3 have the same absolute value and opposite signs.

Thus, when a result of detection by the radar device 3 provides the slope βa of the approximate straight line KL as shown in the graph on the right side of FIG. 9 (A) (i.e., the slope βa having a positive value), it can be determined that there is a downward vertical axis deviation at the vertical axis deviation angle θp corresponding to the slope βa. In this case, the slope angle βka has a positive value, and the vertical axis deviation angle θp has a negative value.

On the other hand, if, as shown in FIG. 9 (C), the direction of the radar device 3 is deviated upward, in the arrangement of the reflection points, as shown in the graph on the right side of FIG. 9 (C), a reflection point located farther from the radar device 3 in the direction of travel (i.e., located closer to the right side of FIG. 9 (C)) is located at a lower position. In this case, the slope βa of the approximate straight line KL has a negative value in the device coordinates.

Thus, when a result of detection by the radar device 3 provides the slope βa of the approximate straight line KL as shown in the graph on the right side of FIG. 9 (C) (i.e., the slope βa having a negative value), it can be determined that there is an upward vertical axis deviation at the vertical axis deviation angle θp corresponding to the slope βa. In this case, the slope angle βka has a negative value, and the vertical axis deviation angle θp has a positive value.

As described above, the angle of axis deviation of the radar device 3 in the vertical direction, that is, the vertical axis deviation angle θp of the radar device 3, can be obtained by using the slope of the reflection points located in the Z-X plane, that is, the slope βa of the approximate straight line KL.

A vertical axis deviation angle θp estimated using a roadside object may be referred to as a first vertical axis deviation angle θpa, or simply referred to as a vertical axis deviation angle θpa. As described later, a vertical axis deviation angle θp estimated using road surface reflection may be referred to as a second vertical axis deviation angle θpb, or simply referred to as a vertical axis deviation angle θpb. Furthermore, as described later, a final vertical axis deviation angle θp may be referred to as a third vertical axis deviation angle θpz, or simply referred to as a vertical axis deviation angle θpz. A vertical axis deviation angle that does not need to be distinguished from other vertical axis deviation angles may be simply referred to as a vertical axis deviation angle θp.

<Estimation of Vertical Axis Deviation Angle Using Road Surface>

Next, a principle of estimation of the vertical axis deviation angle using a road surface (i.e., road surface reflection) will be described.

The principle of estimation of the vertical axis deviation angle using road surface reflection basically the same as the principle of estimation of the vertical axis deviation angle using a roadside object described above, and thus will be briefly described here.

Figure 10:
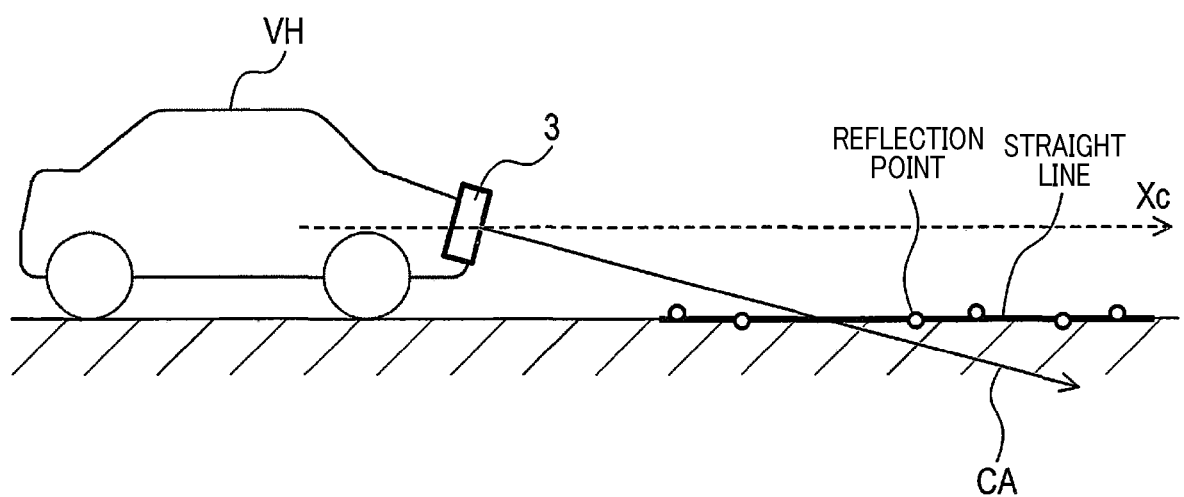

As shown in FIG. 10, when a radar beam is emitted from the radar device 3 in the forward direction of the vehicle VH and the radar beam is reflected from a road surface, the radar wave is usually reflected at a plurality of points (i.e., reflection points) on the road surface.

Thus, as in the process using a roadside object, the vertical axis deviation angle θp (i.e., vertical axis deviation angle θpb) can be estimated by using the plurality of reflection points as a reflection point group (i.e., road surface reflection point group) to obtain an approximate straight line KL (i.e., road surface straight line) from the plurality of reflection points distributed in the vertical plane, and using a slope Bb of the approximate straight line.

1-4. Principle of Process for Road with Gradient

Next, a process performed for a road with a gradient, for example, for a road having a horizontal portion and then a portion with an upward gradient, that is, an uphill portion, will be described. When the gradient of the road is changed by a predetermined value or more at a certain point on the road, a position at which the gradient of the road is changed is referred to as an inflection point.

As shown on the upper side of FIG. 11, on a road that starts to slope uphill at a certain point, when the vehicle VH is located at a sufficient distance before reaching an inflection point, a plurality of reflection points on a roadside object (i.e., roadside object reflection points) located before the inflection point are arranged substantially horizontally in the vertical plane along the approximately horizontal portion of the road. Similarly, a plurality of reflection points on a road surface of the road (i.e., road surface reflection points) located before the inflection point are arranged substantially horizontally in the vertical plane along the approximately horizontal portion of the road.

Thus, the vertical axis deviation can be almost accurately estimated based on the roadside object reflection points. Furthermore, the vertical axis deviation can also be almost accurately estimated based on the road surface reflection points.

However, as shown on the lower side of FIG. 11, when the vehicle VH approaches the inflection point, the reception intensity of a reflected wave at the road surface reflection points is influenced by the gradient of the road surface; thus, it is not easy to accurately estimate the vertical axis deviation based on the road surface reflection points.

In such a case, even when the approximate straight line KL is obtained from the plurality of road surface reflection points arranged in the vertical plane, and a slope of the approximate straight line KL is used to estimate the vertical axis deviation, the slope of the approximate straight line KL is influenced by the gradient of the road surface; thus, it is not easy to accurately estimate the vertical axis deviation based on the road surface reflection points.

In the first embodiment, therefore, the vertical axis deviation is estimated by considering the influence of the gradient of the road on the reflection point information, and as described in detail later, an inflection point is detected from the roadside object information, and information on a position of the inflection point is used to accurately estimate the vertical axis deviation.

1-5. Processes

Next, processes performed by the control device will be described.

(a) Main Routine of Axis Deviation Estimation Process

First, the entire axis deviation estimation process (i.e., main routine) performed by the control device 5 will be described with reference to a flow chart in FIG. 12.

The axis deviation estimation process is a process for estimating the vertical axis deviation angle θp, and is started in response to turning on of an ignition switch.

When this process is started, in step (hereinafter referred to as S) 100, the control device 5 uses the radar device 3 to perform a process of detecting an object in front of the own vehicle VH. The process of detecting an object is called a target detection process, and is a known process as described, for example, in JP 6321448 B mentioned above and the like, and thus will not be described in detail.

In this case, an object (i.e., target) corresponds to a reflection point indicated by reflection point information, and at this stage, the reflection point includes not only a road surface but also a roadside object such as the guardrail 41.

Specifically, in S100, reflection point information is acquired from the radar device 3. The reflection point information is information on each of a plurality of reflection points detected by the radar device 3 mounted on the own vehicle VH. The reflection point information includes at least a horizontal angle and a vertical angle as azimuth angles of the reflection point, and a distance between the radar device 3 and the reflection point. The control device 5 acquires various detection results including an own vehicle speed Cm from the in-vehicle sensor group 9.

In subsequent S110, a roadside object extraction process is performed. The roadside object extraction process is a process for extracting a plurality of reflection points on a roadside object (i.e., roadside object reflection points) that are used to obtain the vertical axis deviation angle θpa acquired using a roadside object (described later).

The roadside object extraction process includes a roadside object candidate point extraction process and a roadside object point group extraction process (described later).

The roadside object candidate point extraction process is a process for extracting a reflection point as a candidate for a roadside object (i.e., roadside object candidate point) from a large number of reflection points obtained by the radar device 3. The roadside object point group extraction process is a process for further extracting a point group that is highly likely to be a roadside object (i.e., roadside object point group) from the plurality of roadside object candidate points obtained by performing the roadside object candidate point extraction process.

In subsequent S120, a vertical axis deviation angle estimation process using a roadside object is performed. As described in detail later, the vertical axis deviation angle estimation process using a roadside object is a process for estimating the vertical axis deviation angle θpa of the radar device 3 from the roadside object point group obtained by performing the roadside object point group extraction process.

In subsequent S130, a road surface reflection extraction process is performed. The road surface reflection extraction process is a process for extracting a plurality of reflection points on a road surface (i.e., road surface reflection points) that are used to obtain the vertical axis deviation angle θpb acquired using road surface reflection (described later).

In subsequent S140, a vertical axis deviation angle estimation process using road surface reflection is performed. As described in detail later, the vertical axis deviation angle estimation process using road surface reflection is a process for estimating the vertical axis deviation angle θpb of the radar device 3 from the plurality of road surface reflection points obtained by performing the road surface reflection extraction process.

In subsequent S150, a process of estimating the final vertical axis deviation angle θpz is performed based on the vertical axis deviation angle θpa obtained by performing the estimation process using a roadside object and the vertical axis deviation angle θpb obtained by performing the estimation process using road surface reflection.

For example, as described later, the process of estimating the final vertical axis deviation angle θpz may be performed by changing a reliability (e.g., a predetermined calculation weight) of estimation of the vertical axis deviation angle θpb using road surface reflection, according to a distance from the own vehicle VH to the inflection point.

In subsequent S160, it is determined whether the final vertical axis deviation angle θpz estimated in S150 needs to be adjusted by the mounting angle adjustment device 7. In this step, in response to an affirmative determination, control proceeds to S170, and in response to a negative determination, control proceeds to S195.

Specifically, in response to a determination that the vertical axis deviation angle θpz of the radar device 3 is a predetermined threshold angle or more, it is determined that the vertical axis deviation angle θpz needs to be adjusted and control proceeds to S170. On the other hand, in response to a determination that the vertical axis deviation angle θpz is less than the threshold angle, control proceeds to S195.

In S170, it is determined whether the vertical axis deviation angle θpz is in an adjustable range that can be adjusted by the mounting angle adjustment device 7. In this step, in response to an affirmative determination, control proceeds to S190, and in response to a negative determination, control proceeds to S180.

In S190, since the vertical axis deviation angle θpz is in the adjustable range, an axis deviation adjustment process is performed. Thus, the mounting angle adjustment device 7 is controlled to adjust the vertical axis deviation angle θpz to be zero.

Specifically, the vertical axis deviation angle θpz is adjusted by rotating the radar device 3 about the lateral axis Ys of the radar device 3 by the vertical axis deviation angle θpz to cause the direction of the radar device 3 to be the reference mounting direction, and control proceeds to S195.

On the other hand, in S180, since the vertical axis deviation angle θpz is not in the adjustable range, no adjustment of the vertical axis deviation angle θpz is performed, and diagnosis information indicating that there is an axis deviation of the radar device 3 (i.e., axis deviation diagnosis) is output to the axis deviation notification device 11, and control proceeds to S195. The axis deviation notification device 11 may output a warning sound based on the axis deviation diagnosis.

In S195, it is determined whether to end the process, for example, based on a determination of whether the ignition switch is turned off. In this step, in response to an affirmative determination, the process is temporarily ended, and in response to a negative determination, control returns to S100.

(b) Roadside Object Candidate Point Extraction Process of Roadside Object Extraction Process Next, the roadside object candidate point extraction process of the roadside object extraction process in S110 shown in FIG. 12 will be described with reference to a flow chart in FIG. 13.

This process is a process for extracting a reflection point as a candidate for a roadside object (i.e., roadside object candidate point) from a large number of reflection points obtained by the radar device 3. The reflection point extracted as a candidate in this process is a point that is probable as a reflection point on the guardrail 41 described above.

The guardrail 41 will be described below as an example of a roadside object, and the guardrail 41 may be hereinafter simply referred to as a roadside object.

Figure 13:
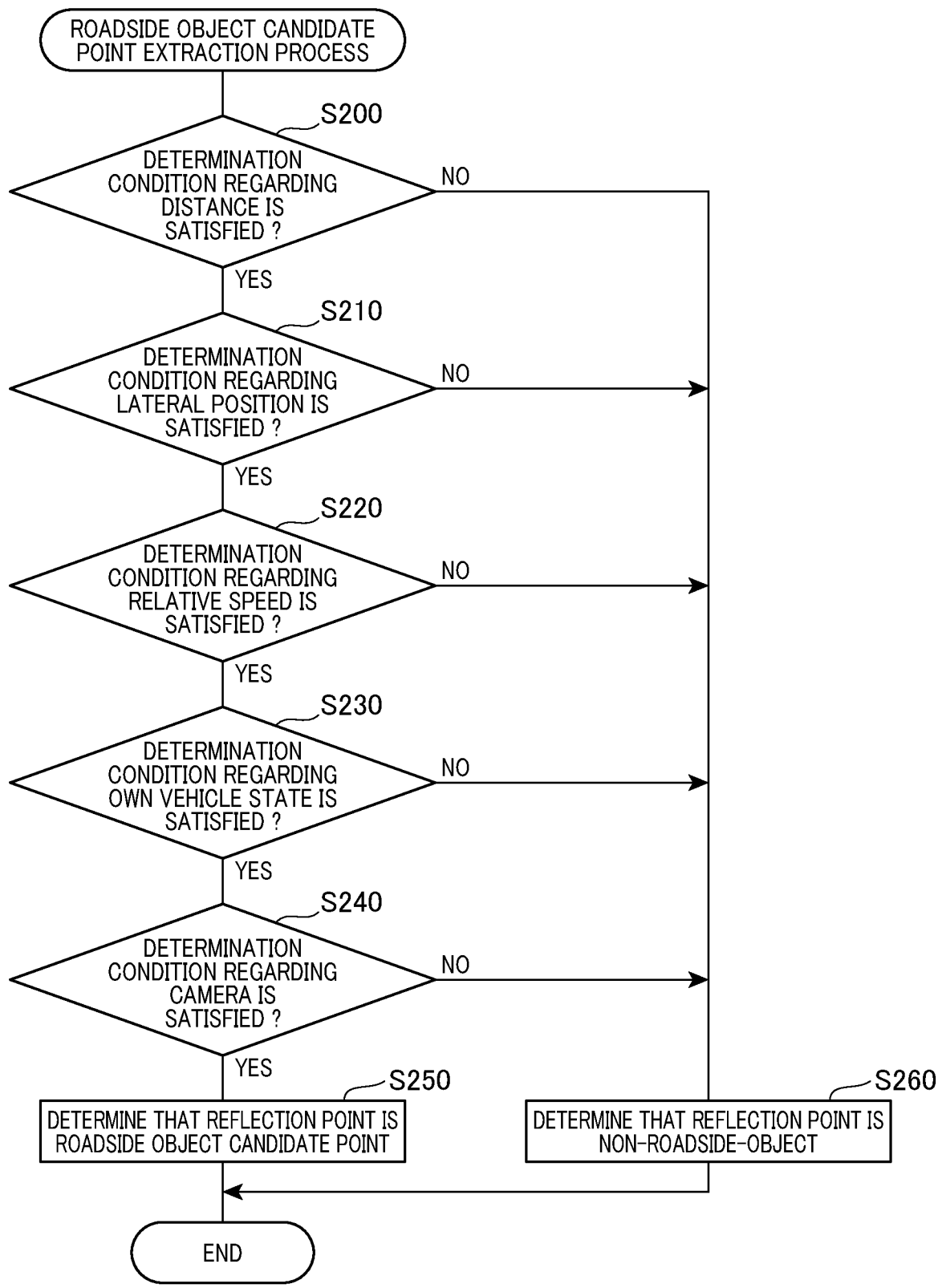
FIG. 13 is a flow chart showing a roadside object candidate point extraction process.

First, in S200 shown in FIG. 13, it is determined whether a "determination condition regarding the distance" is satisfied. In this step, in response to an affirmative determination, control proceeds to S210, and in response to a negative determination, control proceeds to S260.

For example, it is determined whether a reflection point as a determination target in the direction of travel of the own vehicle VH satisfies a "condition that the reflection point is located in a region at a distance greater than 2 m and less than 100 m from the own vehicle VH".

In S210, it is determined whether a "determination condition regarding the lateral position" is satisfied. In this step, in response to an affirmative determination, control proceeds to S220, and in response to a negative determination, control proceeds to S260.

For example, it is determined whether the reflection point satisfies a "condition that when the own vehicle VH travels on a left-hand traffic road (e.g., a two-lane road), the reflection point is located in a region at a distance greater than 2 m and less than 8 m from the own vehicle VH on the left side of the own vehicle VH in the direction of travel".

For example, when the own vehicle VH travels on a single-lane road, it may be determined whether the reflection point is located in a region at a distance greater than 2 m and less than 8 m from the own vehicle VH on the right side of the own vehicle VH.

That is, in S210, it is determined whether the reflection point is located, in the lateral direction of the own vehicle VH, in a region in which the guardrail 41 as a roadside object is highly likely to be located.

In S220, it is determined whether a "determination condition regarding the relative speed" is satisfied. In this step, in response to an affirmative determination, control proceeds to S230, and in response to a negative determination, control proceeds to S260.

Specifically, since the guardrail 41 is a stationary object, in this case, it is determined whether the reflection point satisfies a "condition that the speed (i.e., relative speed) of the reflection point with respect to the own vehicle VH corresponds to the speed of the own vehicle VH (i.e., own vehicle speed Cm) for a stationary object". When the own vehicle speed Cm has a positive value, the detected relative speed has a negative value.

The determination on the relative speed can be performed by determining whether the absolute value of the relative speed is within a predetermined margin of error of +A from the absolute value of the own vehicle speed Cm.

In S230, it is determined whether a "determination condition regarding the traveling state of the own vehicle VH (i.e., own vehicle state)" is satisfied. In this step, in response to an affirmative determination, control proceeds to S240, and in response to a negative determination, control proceeds to S260.

For example, when the own vehicle VH is traveling in a straight line or the acceleration of the own vehicle VH is constant, the accuracy in detection of a reflection point is presumably high; thus, in this case, it is determined, based on information from the in-vehicle sensor group 9, whether the own vehicle state is a stable state in which the own vehicle VH travels in a steady state.

For example, it may be determined that the own vehicle VH is traveling in a straight line in the case where during traveling of the own vehicle VH, the yaw angle detected by the yaw rate sensor or the steering angle of the steering wheel detected by the steering angle sensor is a predetermined value or less. Furthermore, it may be determined that the acceleration of the own vehicle VH is constant in the case where the acceleration detected by the acceleration sensor is a predetermined value or less.

When the detection value used for the above determination is within a predetermined margin of error, it may be determined that the own vehicle VH is traveling in a straight line or that the acceleration of the own vehicle VH is constant.

In S240, it is determined whether a "determination condition regarding the camera 15" is satisfied. In this step, in response to an affirmative determination, control proceeds to S250, and in response to a negative determination, control proceeds to S260.

For example, the determination may be performed by processing an image captured by the camera 15 using a known image processing method, and determining from the image whether an object located at a position of the reflection point in the image is highly likely to be the guardrail 41. The method of detecting the guardrail 41 from the image captured by the camera 15 is a known method as described, for example, in JP 2011-118753 A and the like.

In S250, since an affirmative determination has been made for the reflection point as a determination target in all the steps S200 to S240, the reflection point is stored in the memory 27 as a roadside object candidate point that is highly likely to be a reflection point on the guardrail 41, and the process is temporarily ended.

On the other hand, in S260, since a negative determination has been made in any of the steps S200 to S240, the reflection point is stored in the memory 27 as a non-roadside-object that is unlikely to be the guardrail 41, and the process is temporarily ended.

The processes in S200 to S260 described above are performed for all the reflection points obtained by performing the object detection process; thus, all the reflection points are classified as a roadside object candidate point or a non-roadside-object.

(c) Roadside Object Point Group Extraction Process of Roadside Object Extraction Process Next, the roadside object point group extraction process of the roadside object extraction process in S110 will be described with reference to a flow chart in FIG. 14.

Figure 12:
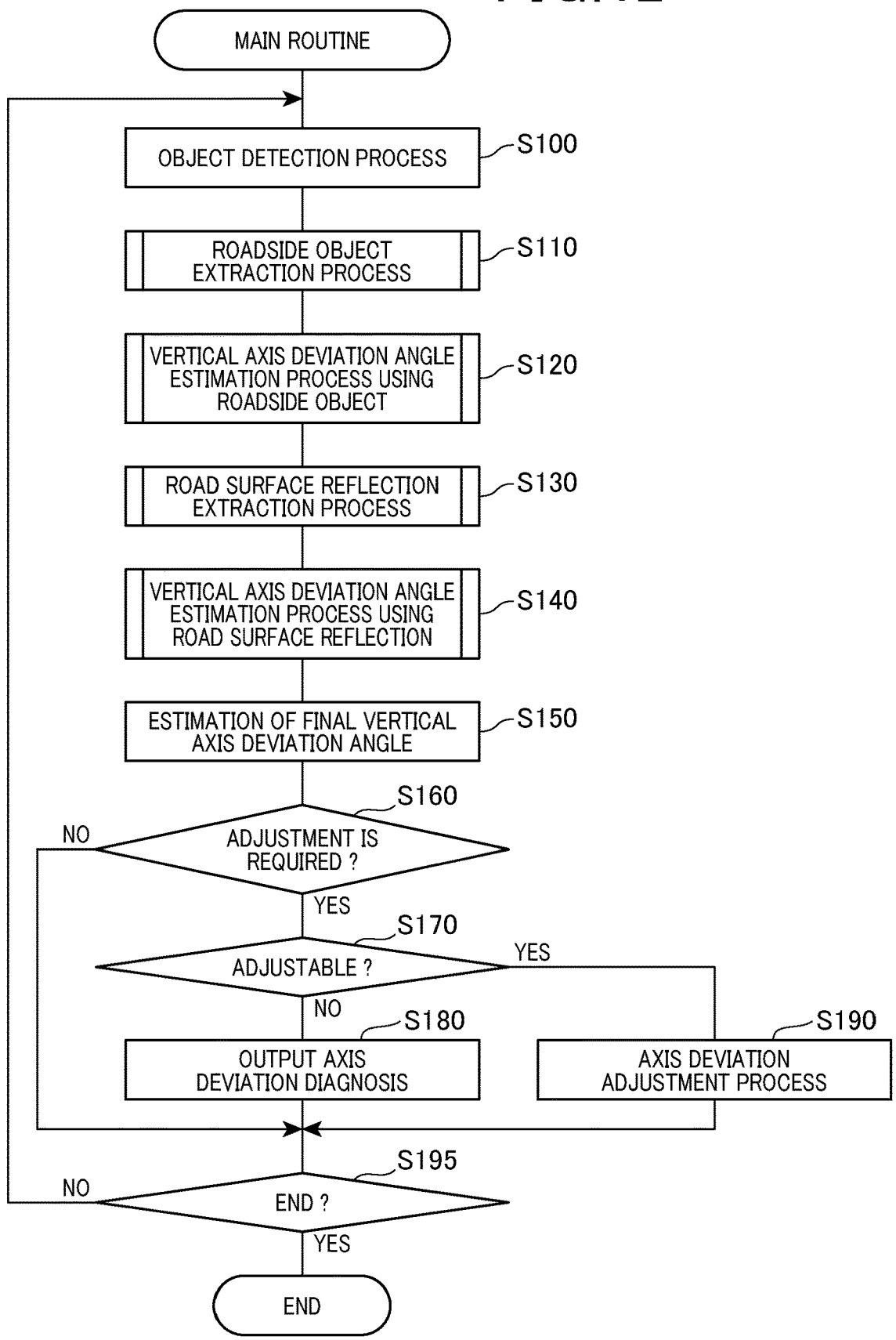
FIG. 12 is a flow chart showing a main routine of an axis deviation estimation process.

This process is the process in S110 shown in FIG. 12, and is a process for extracting, from the plurality of roadside object candidate points obtained by performing the roadside object candidate point extraction process in FIG. 13, a roadside object point group used to calculate the vertical axis deviation angle $\theta p$. A roadside object point group is composed of a plurality of reflection points.

Figure 14:
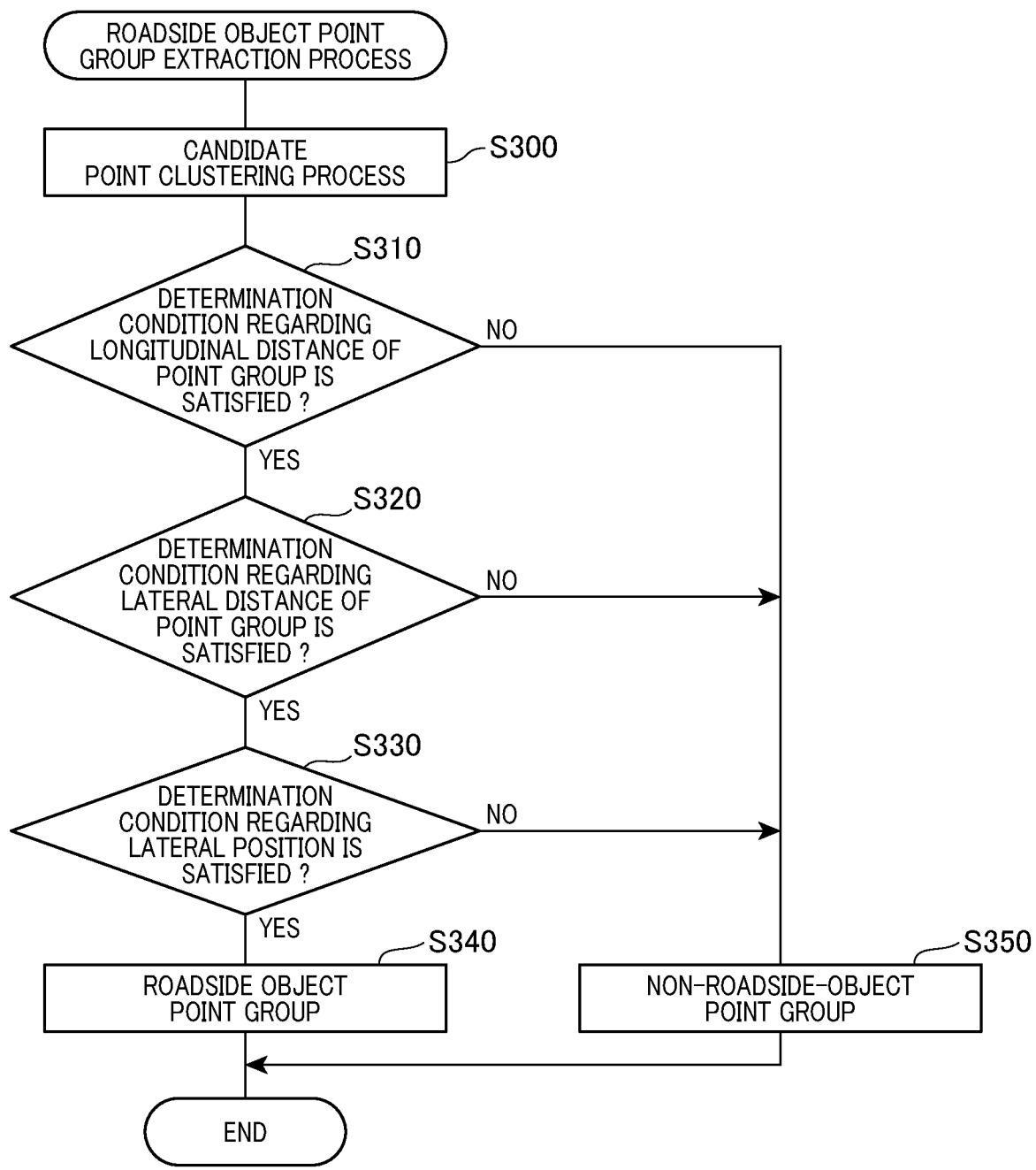
FIG. 14 is a flow chart showing a roadside object point group extraction process.

First, in S300 shown in FIG. 14, a candidate point clustering process is performed. That is, clustering (i.e., classification) of the plurality of roadside object candidate points is performed.

For example, the plurality of reflection points as the plurality of roadside object candidate points are divided into a plurality of (e.g., 6) clusters using a known k-means method or the like. Although each reflection point is three-dimensional data with the XYZ coordinates in the vehicle coordinates, the XY coordinates of the reflection point are used for clustering.

In subsequent S310, it is determined whether a "determination condition regarding the longitudinal distance of the roadside object point group (i.e., point group)" is satisfied. In this step, in response to an affirmative determination, control proceeds to S320, and in response to a negative determination, control proceeds to S350.

That is, for all the roadside object candidate points (i.e., roadside object point group) in each of the clusters into which the roadside object candidate points are divided, it is determined whether the determination condition regarding the longitudinal distance is satisfied.

Specifically, for example, for the roadside object point group corresponding to each cluster, that is, for all the reflection points of the roadside object point group, it is determined whether the length of the roadside object point group in the depth direction which is the direction of travel of the own vehicle VH exceeds a certain range. That is, for all the reflection points in each cluster as a determination target, it is determined whether a value obtained by subtracting a distance in the depth direction between the own vehicle VH and the reflection point closest to the own vehicle VH (i.e., the minimum value) from a distance in the depth direction between the own vehicle VH and the reflection point farthest from the own vehicle VH (i.e., the maximum value) exceeds a predetermined threshold.

The determination in S310 makes it possible to extract, from all the clusters, a cluster that satisfies the determination condition regarding the longitudinal distance of the point group. That is, it is possible to extract, from all the clusters, a cluster in which the reflection points satisfy the determination condition regarding the longitudinal distance of the point group.

In this case, it is determined that a cluster satisfies the determination condition regarding the longitudinal distance when all the reflection points in the cluster satisfy the distance condition described above. However, it may be determined that a cluster satisfies the determination condition regarding the longitudinal distance when a predetermined ratio or more of the reflection points in the cluster satisfy the distance condition described above. This also applies to the following determination condition.

In S320, it is determined whether a "determination condition regarding the lateral distance of the point group" is satisfied. In this step, in response to an affirmative determination, control proceeds to S330, and in response to a negative determination, control proceeds to S350.

That is, for all the reflection points of the roadside object point group of the cluster for which an affirmative determination has been made in S310, it is determined whether the determination condition regarding the lateral distance is satisfied.

Specifically, for example, for all the reflection points of the roadside object point group in the cluster, it is determined whether the length of the roadside object point group in the width direction which is the lateral direction of the own vehicle VH exceeds a certain range. That is, for all the reflection points, it is determined whether a value obtained by subtracting a distance in the width direction between the own vehicle VH and the reflection point closest to the own vehicle VH (i.e., the minimum value) from a distance in the width direction between the own vehicle VH and the reflection point farthest from the own vehicle VH (i.e., the maximum value) exceeds a predetermined threshold.

The determination in S320 makes it possible to further extract, from the clusters that satisfy the determination condition regarding the longitudinal distance of the point group, a cluster that satisfies the determination condition regarding the lateral distance of the point group.

In S330, it is determined whether a "determination condition regarding the lateral position" is satisfied. In this step, in response to an affirmative determination, control proceeds to S340, and in response to a negative determination, control proceeds to S350.

That is, for the cluster for which an affirmative determination has been made in S320, it is determined whether the determination condition regarding the lateral position is satisfied.

Specifically, it is determined whether the point group of the cluster as a determination target is located at the innermost position in the lateral direction of the own vehicle VH. Thus, the point group located at the innermost position is selected.

For example, assuming that a position on the right side of the own vehicle has a positive value in the left-hand traffic, it is determined whether the lateral position of the point group has a positive value (i.e., the point group is located on the right side of the own vehicle) and is closest to the own vehicle.

Furthermore, assuming that a position on the right side of the own vehicle has a positive value in the left-hand traffic, it is determined whether the lateral position of the point group has a negative value (i.e., the point group is located on the left side of the own vehicle) and is closest to the own vehicle.

In S340, since an affirmative determination has been made in all the steps S310 to S330, the selected point group of the cluster is determined as a point group that indicates reflection points on a roadside object (i.e., roadside object point group), and is stored in the memory 27, and then the process is temporarily ended.

On the other hand, in S350, since a negative determination has been made in any of the steps S310 to S330, the point group of the cluster for which a negative determination has been made is determined as a point group that does not indicate a reflection point on a roadside object (i.e., non-roadside-object point group), and the process is temporarily ended.

The determination processes in S310 to S330 are performed to extract a reflection point that is probable as a roadside object such as the guardrail 41.

(d) Vertical Axis Deviation Angle Estimation Process Using Roadside Object

Figure 15:
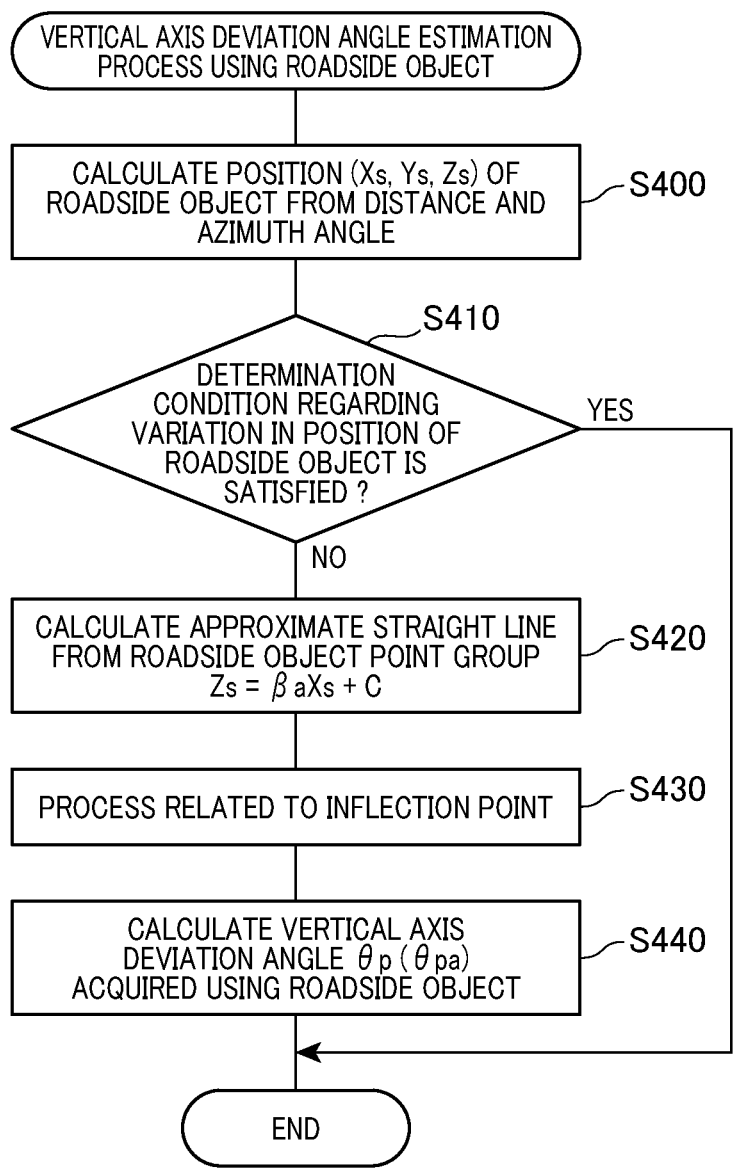
FIG. 15 is a flow chart showing a vertical axis deviation angle estimation process using a roadside object.

Next, the vertical axis deviation angle estimation process using a roadside object will be described with reference to a flow chart in FIG. 15.

This process is the process in S120 shown in FIG. 12, and is a process for calculating the vertical axis deviation angle θpa from the roadside object point group (i.e., reflection point group) obtained by performing the roadside object point group extraction process in FIG. 14.

First, in S400, for each roadside object point (i.e., a reflection point corresponding to each roadside object point) of the roadside object point group obtained by performing the roadside object point group extraction process, coordinates of a position of the roadside object point (i.e., device coordinates) are calculated based on the distance and the azimuth angle included in the reflection point information corresponding to the roadside object point.

The device coordinates are three-dimensional coordinates based on the coordinate axes of the radar device 3, that is, the coordinates (Xs, Ys, Zs). The reflection point information is obtained by performing the object detection process in FIG. 12.

That is, for all the roadside object points (i.e., reflection points) of the roadside object point group, the control device 5 calculates the coordinates (Xs, Ys, Zs) as the device coordinates, and stores the coordinates in the memory 27.

In subsequent S410, it is determined whether each roadside object point satisfies a determination condition regarding variation in position of the roadside object point of the roadside object point group (i.e., roadside object position). In this step, in response to an affirmative determination, the process is temporarily ended, and in response to a negative determination, control proceeds to S420.

The determination condition regarding the variation is a condition for determining whether in the Z-X plane of the device coordinates, the position of a roadside object point group (i.e., a plurality of reflection points) varies to such a degree that it is difficult to approximate the plurality of reflection points by the approximate straight line KL described above (i.e., whether the degree of variation is a predetermined value or more). For the determination condition, for example, a correlation coefficient of the plurality of reflection points in the Z-X plane may be used.

That is, in the first embodiment, the approximate straight line KL is used to estimate the vertical axis deviation angle θpa; thus, in this case, the determination on the variation is performed by eliminating reflection points with a large variation in the position, and extracting reflection points with a small variation in the position that make it possible to obtain the approximate straight line KL that can be used to estimate the vertical axis deviation angle θpa.

In S420, since the variation is determined to be small in S410 described above, for all the reflection points of the roadside object point group, equation (1) of the approximate straight line KL is obtained using a least-squares method. That is, the following approximate straight line KL in the Z-X plane of the device coordinates is obtained. In equation (1), βa is a slope, and C is an intercept.

$$Zs=\beta aXs+C \qquad (1)$$

In subsequent S430, a process related to an inflection point is performed.

Specifically, first, a process of detecting an inflection point is performed using the roadside object point group. Thus, the process of detecting an inflection point is performed based on a predetermined inflection point determination condition.

Figure 16:
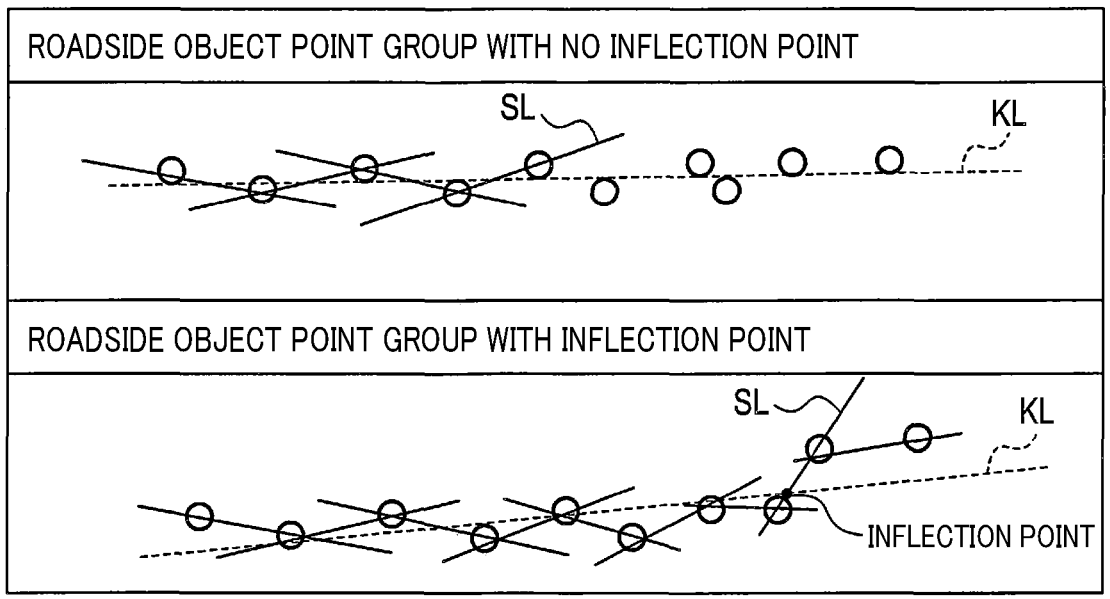
FIG. 16 is an explanatory diagram showing an inflection point of a reflection point group.

The inflection point determination condition is a condition for determining whether the plurality of roadside object points (i.e., the plurality of reflection points) as a whole are arranged in an approximately straight line in the Z-X plane of the device coordinates as shown in FIG. 16.

For example, as shown in FIG. 16, the approximate straight line KL is obtained for all the reflection points of the roadside object point group, and a straight line SL is drawn between adjacent reflection points. Then, it may be determined that the inflection point determination condition is not satisfied (i.e., there is an inflection point) when an angle at which the approximate straight line KL intersects with each straight line SL is a predetermined value or more. In this case, the inflection point is located at an intersection point of the approximate straight line KL and the straight line SL; thus, a coordinate (e.g., X coordinate of the vehicle coordinates) of the inflection point can be obtained.

Two reflection points between which the straight line SL is drawn may not necessarily be adjacent reflection points, and may be two reflection points separated from each other by the minimum distance among reflection points separated from each other by a predetermined distance or more.

That is, the vertical axis deviation angle θpa is estimated in a situation in which a roadside object such as the guardrail 41 continuously extends along the road in a certain state, for example, at a constant height; thus, in this case, it is determined whether the roadside object continuously extends in such a state.

The roadside object point group shown on the upper side of FIG. 16 is an example of a roadside object point group having no inflection point, and the roadside object point group shown on the lower side of FIG. 16 is an example of a roadside object point group having an inflection point.

A roadside object point group "having an inflection point" indicates that a plurality of reflection points of the roadside object point group are not arranged in a straight line and are arranged discontinuously at a certain point. Specifically, an inflection point indicates a position at which the roadside object point group is assumed to be arranged in a curve in the vertical plane, that is, a position at which the reflection points of the roadside object point group distributed in the vertical plane are arranged in a curve. In this case, as described above, an inflection point can be defined as an intersection point of the approximate straight line KL and the straight line SL.

Then, a position of the inflection point detected in this manner, that is, the X coordinate of the vehicle coordinates of the inflection point, is obtained. Specifically, a distance between the own vehicle VH and the inflection point is obtained. The distance between the own vehicle VH and the inflection point is used in a process related to the reliability (described later).

In subsequent S440, an angle corresponding to the slope βa of the equation (1) indicating the approximate straight line KL (i.e., slope angle βka) is obtained, and the sign of the angle is reversed to obtain the vertical axis deviation angle θpa acquired using a roadside object, and then the process is temporarily ended.

Thus, the vertical axis deviation angle θpa of the radar device 3 can be obtained using a roadside object.

Figure 17:
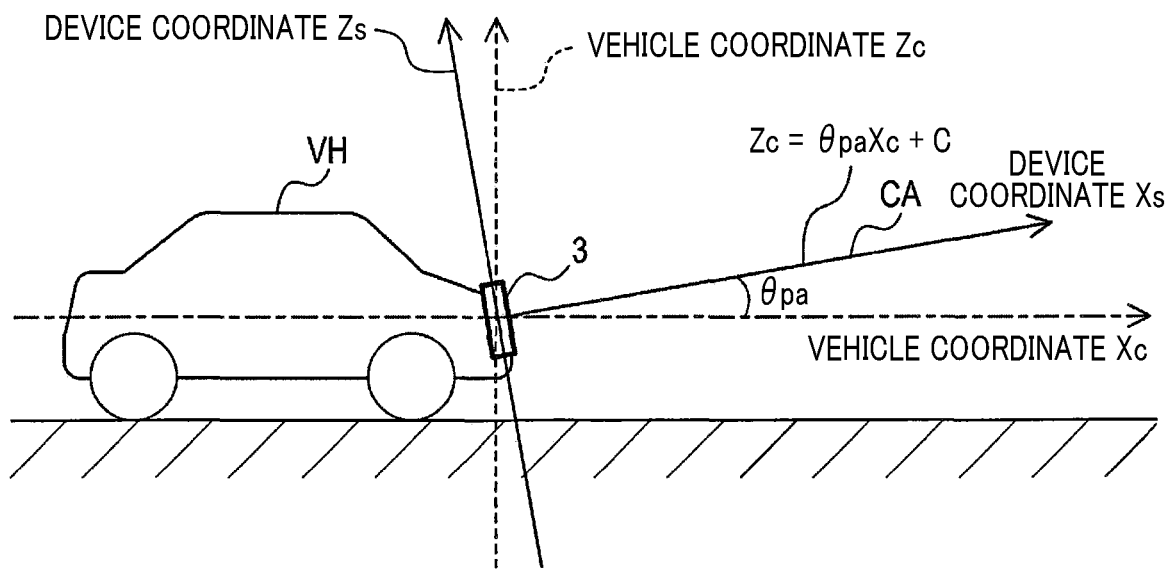
FIG. 17 is an explanatory diagram showing a relationship between vehicle coordinates, device coordinates, and the vertical axis deviation angle.

FIG. 17 shows a relationship between the device coordinates and the vehicle coordinates. In this case, the vertical axis deviation angle θpa of upward axis deviation of the radar device 3 has a positive value; thus, for example, the longitudinal axis Xs of the device coordinates is rotated counterclockwise by the vertical axis deviation angle θpa with respect to the traveling direction axis Xc of the vehicle coordinates.

Thus, in the vehicle coordinates, the straight line indicating the center axis CA whose direction is the direction of the radar device 3 can be expressed by the following equation (2). C is an intercept.

$$Zc=\theta paXc+C \qquad (2)$$

(e) Road Surface Reflection Extraction Process

Next, the road surface reflection extraction process in S130 shown in FIG. 12 will be described with reference to a flow chart in FIG. 18.

This process is a process for extracting a reflection point on a road surface (i.e., road surface reflection point) from a large number of reflection points obtained by the radar device 3.

First, in S500, it is determined whether a determination condition regarding the distance is satisfied. In this step, in response to an affirmative determination, control proceeds to S510, and in response to a negative determination, control proceeds to S570.

For example, it is determined whether the distance to the reflection point is less than a predetermined distance threshold. When the distance to the reflection point is less than the predetermined distance threshold, the reflection point is highly likely to be a reflection point of the radar wave.

In S510, it is determined whether a determination condition regarding the azimuth is satisfied. In this step, in response to an affirmative determination, control proceeds to S520, and in response to a negative determination, control proceeds to S570.

For example, it is determined whether the azimuth of the reflection point is located in an extraction region which is a predetermined azimuth region including the center axis CA in the horizontal direction. When the azimuth of the reflection point is in the extraction region, the reflection point is highly likely to be a reflection point of the radar wave. In the first embodiment, in which the radar device 3 is mounted on the front of the own vehicle VH, the extraction region may be a predetermined region in the vicinity of the own vehicle VH in the direction of travel. The extraction region may be determined in advance by experiment or the like.

In S520, it is determined whether a determination condition regarding the power is satisfied. In this step, in response to an affirmative determination, control proceeds to S530, and in response to a negative determination, control proceeds to S570.

For example, it is determined whether the reflected power from the reflection point is less than a predetermined power threshold. That is, the reflected power from a road surface is presumably smaller than, for example, the reflected power from another vehicle; thus, the power threshold may be appropriately determined based on such reflected power from a road surface. The power threshold may be determined in advance, for example, by experiment or the like.

In S530, it is determined whether a determination condition regarding the relative speed is satisfied. In this step, in response to an affirmative determination, control proceeds to S540, and in response to a negative determination, control proceeds to S570.

Specifically, since the road surface is a stationary object, in this case, it is determined whether the reflection point satisfies a "condition that the speed (i.e., relative speed) of the reflection point with respect to the own vehicle VH corresponds to the speed of the own vehicle VH (i.e., own vehicle speed Cm) for a stationary object". When the own vehicle speed Cm has a positive value, the detected relative speed has a negative value.

The determination on the relative speed can be performed by determining whether the absolute value of the relative speed is within a predetermined margin of error of +A from the absolute value of the own vehicle speed Cm.

In S540, it is determined whether a "determination condition regarding the traveling state of the own vehicle VH (i.e., own vehicle state)" is satisfied. In this step, in response to an affirmative determination, control proceeds to S550, and in response to a negative determination, control proceeds to S570.

For example, when the own vehicle VH is traveling in a straight line or the acceleration of the own vehicle VH is constant, the accuracy in detection of a road surface reflection point is presumably high; thus, in this case, it is determined, based on information from the in-vehicle sensor group 9, whether the own vehicle state is a stable state in which the own vehicle VH travels in a steady state.

For example, it may be determined that the own vehicle VH is traveling in a straight line in the case where during traveling of the own vehicle VH, the yaw angle detected by the yaw rate sensor or the steering angle of the steering wheel detected by the steering angle sensor is a predetermined value or less. Furthermore, it may be determined that the acceleration of the own vehicle VH is constant in the case where the acceleration detected by the acceleration sensor is a predetermined value or less.

When the detection value used for the above determination is within a predetermined margin of error, it may be determined that the own vehicle VH is traveling in a straight line or that the acceleration of the own vehicle VH is constant.

In S550, it is determined whether a determination condition regarding the camera 15 is satisfied. In this step, in response to an affirmative determination, control proceeds to S560, and in response to a negative determination, control proceeds to S570.

For example, the determination may be performed by processing an image captured by the camera 15 using a known image processing method, and determining from the image whether an object located at a position of the reflection point in the image is highly likely to be a road surface. The method of detecting a road surface from the image captured by the camera 15 is a known method, and thus will not be described.

In S560, since an affirmative determination has been made for the reflection point as a determination target in all the steps S500 to S550, the reflection point is stored in the memory 27 as a reflection point on a road surface (i.e., road surface reflection point), and the process is temporarily ended.

On the other hand, in S570, since a negative determination has been made in any of the steps S500 to S550, the reflection point is stored in the memory 27 as a reflection point that is not a road surface reflection point (i.e., non-road-surface-reflection-point), and the process is temporarily ended.

The processes in S500 to S570 described above are performed for all the reflection points obtained by performing the object detection process; thus, all the reflection points are classified as a road surface reflection point at which road surface reflection occurs or a non-road-surface-reflection-point at which no road surface reflection occurs.

Figure 19:
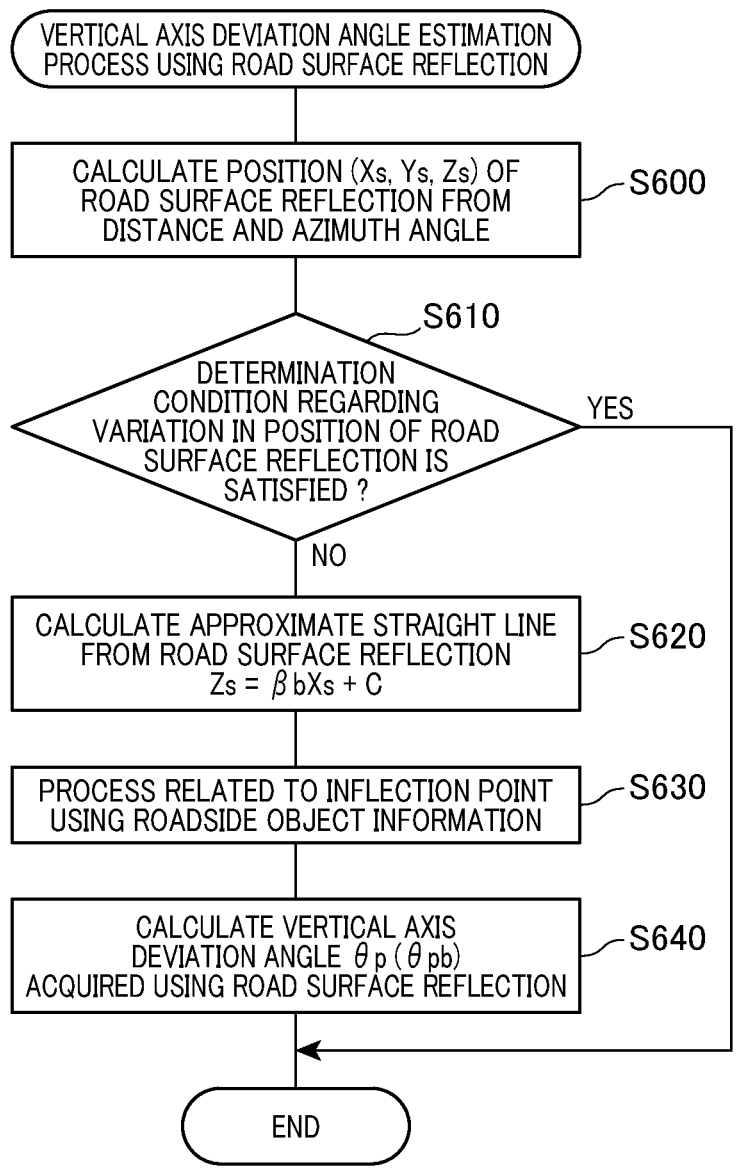
FIG. 19 is a flow chart showing a vertical axis deviation angle estimation process using road surface reflection.

(f) Vertical Axis Deviation Angle Estimation Process Using Road Surface Reflection Next, the vertical axis deviation angle estimation process using road surface reflection will be described with reference to a flow chart in FIG. 19.

In the vertical axis deviation angle estimation process using road surface reflection, the same content as that of the vertical axis deviation angle estimation process using a roadside object described above will not be described or will be briefly described.

Figure 18:
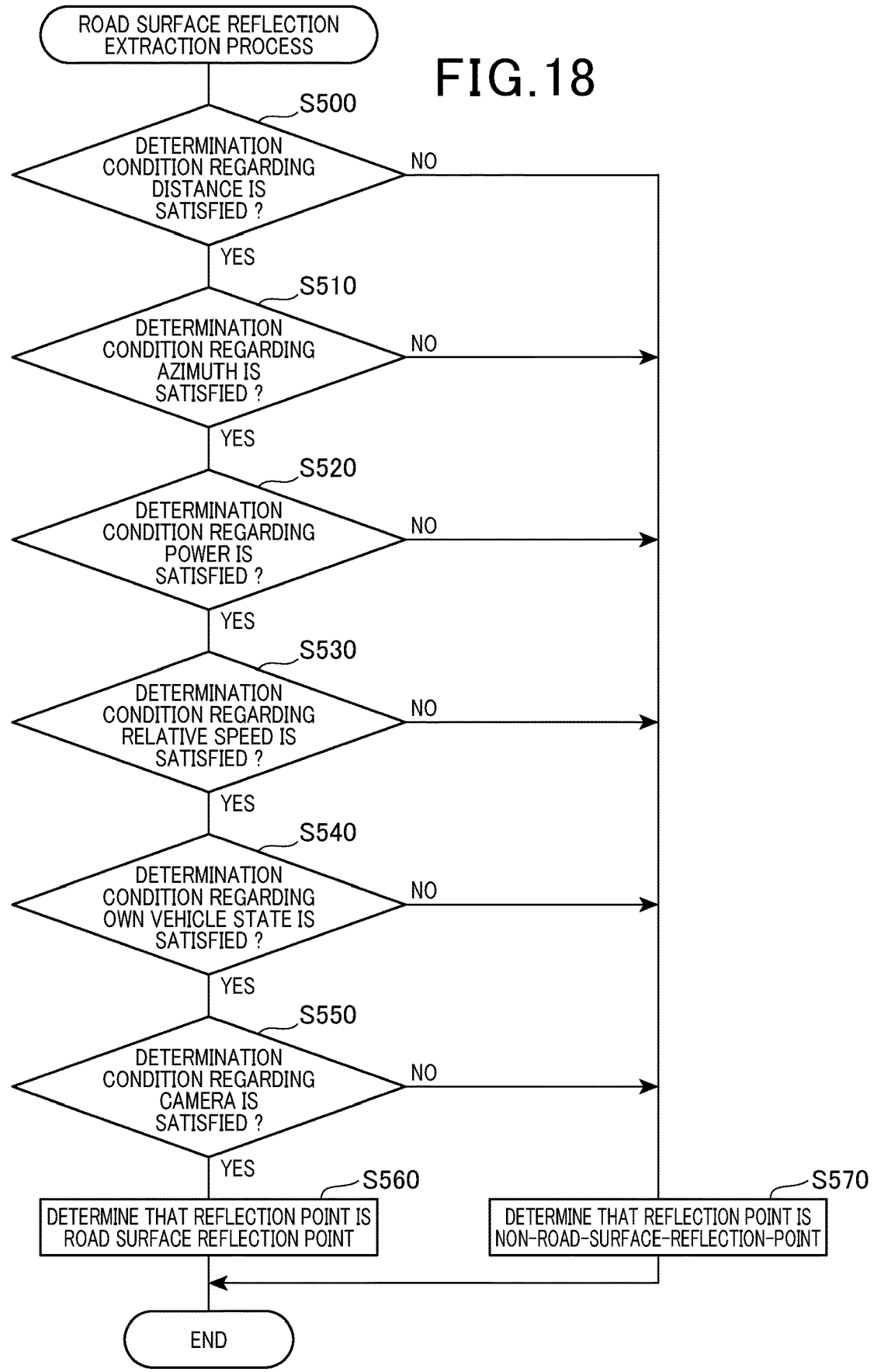
FIG. 18 is a flow chart showing a road surface reflection extraction process.

This process is the process in S140 shown in FIG. 12, and is a process for calculating the vertical axis deviation angle $\theta pb$ from a large number of road surface reflection points (i.e., road surface reflection point group) obtained by performing the road surface reflection extraction process in FIG. 18.

First, in S600, for each road surface reflection point of the road surface reflection point group obtained by performing the road surface reflection extraction process, coordinates of a position of the road surface reflection point (i.e., device coordinates) are calculated based on the distance and the azimuth angle included in the reflection point information corresponding to the road surface reflection point. That is, for all the road surface reflection points of the road surface reflection point group, the control device 5 calculates the coordinates (Xs, Ys, Zs) as the device coordinates, and stores the coordinates in the memory 27.

In subsequent S610, it is determined whether each road surface reflection point satisfies a determination condition regarding variation in position of the road surface reflection point of the road surface reflection point group (i.e., road surface reflection position). In this step, in response to an affirmative determination, the process is temporarily ended, and in response to a negative determination, control proceeds to S620.

The determination condition regarding the variation is used to determine whether in the Z-X plane of the device coordinates, the position of all the road surface reflection points of the road surface reflection point group varies to such a degree that it is difficult to approximate the road surface reflection points by the approximate straight line KL described above (i.e., whether the degree of variation is a predetermined value or more). For the determination condition, for example, a correlation coefficient of the road surface reflection point group in the Z-X plane may be used.

That is, in the first embodiment, the approximate straight line KL is used to estimate the vertical axis deviation angle θpb; thus, in this case, the determination on the variation is performed by extracting reflection points with a small variation in the position that make it possible to obtain the approximate straight line KL that can be used to estimate the vertical axis deviation angle θpb.

In S620, since the variation is determined to be small in S610 described above, for all the reflection points of the road surface reflection point group, equation (3) of the approximate straight line KL similar to the equation (1) is obtained using a least-squares method. That is, the following approximate straight line KL in the Z-X plane of the device coordinates is obtained. In the equation (3), Bb is a slope, and C is an intercept.

$$Zs = \beta b Xs + C \quad (3)$$

In subsequent S630, a process related to an inflection point using roadside object information is performed. Specifically, the X coordinate (i.e., Xc) of the inflection point calculated in S430 is acquired.

In subsequent S640, an angle corresponding to the slope Bb of the equation (3) indicating the approximate straight line KL (i.e., slope angle βkb) is obtained, and the sign of the angle is reversed to obtain the vertical axis deviation angle θpb acquired using road surface reflection, and then the process is temporarily ended.

Thus, the vertical axis deviation angle θpb of the radar device 3 can be obtained using road surface reflection.

In the vehicle coordinates, the straight line indicating the center axis CA whose direction is the direction of the radar device 3 can be expressed by the following equation (4). C is an intercept.

$$Zc = \theta pb Xc + C \quad (4)$$

(g) Process of Estimating Final Vertical Axis Deviation Angle

Next, the process of estimating the final vertical axis deviation angle in S150 shown in FIG. 12 will be described.

In the first embodiment, the final vertical axis deviation angle θpz (i.e., third vertical axis deviation angle θpz) used to correct an axis deviation is obtained based on the vertical axis deviation angle θpa (i.e., first vertical axis deviation angle θpa) obtained by performing the vertical axis deviation angle estimation process using a roadside object, and the vertical axis deviation angle θpb (i.e., second vertical axis deviation angle θpb) obtained by performing the vertical axis deviation angle estimation process using road surface reflection.

In this case, the third vertical axis deviation angle θpz is calculated, for example, using a weighted average of the first vertical axis deviation angle θpa and the second vertical axis deviation angle θpb. The process will be specifically described below.

<Inflection Point Located Away from Vehicle>

For example, as shown on the upper side of FIG. 11, when a position (i.e., X coordinate) of the inflection point in the vehicle coordinates is located farther from the own vehicle VH than the maximum position (i.e., X coordinate) of the road surface reflection point in the vehicle coordinate, the influence of the gradient of the road surface on the reflection point information on the road surface is presumably small. That is, when a distance from the own vehicle VH to the inflection point is greater than a distance from the own vehicle VH to the maximum position of the road surface reflection point (i.e., maximum distance SS), the influence of the gradient of the road surface on the reflection point information on the road surface is presumably small.

Accordingly, the second vertical axis deviation angle θpb obtained using road surface reflection presumably has a high reliability. When there is an inflection point even at a position away from the own vehicle VH, the reflection point information on the roadside object is presumably slightly influenced by the gradient of the road surface corresponding to the inflection point.

Thus, as described above, when the position of the inflection point is located away from the own vehicle VH, the third vertical axis deviation angle θpz is calculated by weighting the second vertical axis deviation angle θpb, that is, by causing the second vertical axis deviation angle θpb to have a weight (e.g., 2) greater than the weight (e.g., 1) of the first vertical axis deviation angle θpa. Thus, the weight corresponding to the reliability of the second vertical axis deviation angle θpb is changed according to the position of the inflection point. A reliability indicates the degree of reliability, and when the degree of reliability (i.e., reliability) is high, a large numerical value is used for weighting.

For example, as calculated by the following equation (5), the third vertical axis deviation angle θpz is calculated by weighting the value (i.e., θpb) of the second vertical axis deviation angle θpb. In the equation (5), θpa, θpb, and θpz represent the first, second, and third vertical axis deviation angles, respectively.

$$(\theta pa + 2\theta pb)/3 = \theta pz \quad (5)$$

Thus, the third vertical axis deviation angle θpz with higher accuracy can be calculated. When no consideration of an inflection point is assumed to be required, for example, when the distance from the own vehicle VH to the inflection point is several times (e.g., 5 times) or more the maximum distance SS, or when no inflection point is detected, the reliability of the second vertical axis deviation angle θpb obtained using road surface reflection and the reliability of the first vertical axis deviation angle θpa obtained using a roadside object may be set to be approximately the same.

<Inflection Point Located Near Vehicle>

For example, as shown on the lower side of FIG. 11, when the position of the inflection point in the vehicle coordinates is located at the maximum position of the road surface reflection point in the vehicle coordinate or at a position closer to the own vehicle VH than the maximum position of the road surface reflection point in the vehicle coordinate, the reflection point information on the roadside object and the reflection point information on the road surface are presumably influenced by the gradient of the road surface corresponding to the inflection point. That is, when the distance from the own vehicle VH to the inflection point is equal to or less than the maximum distance SS which is the distance from the own vehicle VH to the maximum position of the road surface reflection point, the reflection point information on the roadside object and the reflection point information on the road surface are presumably influenced by the gradient of the road surface corresponding to the inflection point.

The distance from the own vehicle VH to the position of the inflection point may be, for example, in the range of ½ the maximum distance SS to the maximum distance SS.

In this case, it can be determined, by experiment or the like, which of the roadside object and the road surface is more influenced by the gradient of the road surface corresponding to the inflection point. For example, when the roadside object and the road surface are influenced by the gradient of the road surface corresponding to the inflection point to approximately the same degree, the third vertical axis deviation angle θpz can be obtained, for example, as calculated by the following equation (6).

$$(\theta pa + \theta pb)/2 = \theta pz \quad (6)$$

When the own vehicle VH further approaches the inflection point, for example, when the distance between the own vehicle VH and the inflection point becomes less than ½ the maximum distance SS, the reflection point information on the roadside object and the reflection point information on the road surface are presumably greatly influenced by the gradient of the road surface. Accordingly, the first vertical axis deviation angle θpa and the second vertical axis deviation angle θpb presumably have low accuracy, leading to the third vertical axis deviation angle θpz with low accuracy. Thus, in such a case, the main routine in FIG. 12 may be ended without performing the processes in S160 to S190 shown in FIG. 12.

<Others>

When one of the first vertical axis deviation angle θpa and the second vertical axis deviation angle θpb cannot be calculated, for example, when the variation in position of the reflection points required to estimate one of these vertical axis deviation angles θp is large, the third vertical axis deviation angle θpz may be a vertical axis deviation angle θp obtained by calculation as long as such a vertical axis deviation angle θp satisfies, for example, a condition that the inflection point is located farther from the own vehicle VH than a predetermined position.

1-6. Effects

The first embodiment provides the following effects.

(1a) The first embodiment includes the object information acquisition unit 31, the roadside object extraction unit 33, the road surface extraction unit 35, and the axis deviation angle estimation unit 37.

In the first embodiment, the above configuration makes it possible to easily extract, from reflection object information on a reflection object corresponding to a reflection point of a radar wave obtained by driving the radar device 3, roadside object information such as a position of the reflection point on a roadside object such as the guardrail 41 provided along a travel path. For example, the guardrail 41 is provided at a constant height along the road on the side of the road at a higher position than the road surface. Thus, even when the direction of a radar beam is deviated upward, a reflected wave from the guardrail 41 is more easily detected than a reflected wave from the road surface.

In the first embodiment, therefore, the gradient of the road surface of the travel path can be estimated based on the roadside object information having the characteristics described above. For example, when a portion of the guardrail 41 that is located farther from the radar device is located at a higher position, it can be assumed that a portion of the road surface that is located farther from the radar device is also located at a higher position.

Thus, for example, when a vertical axis deviation of the radar device is estimated based on the road surface information, the state of the road surface such as the gradient of the road surface can be estimated based on the roadside object information obtained by using a reflected wave from the roadside object having the characteristics described above.

That is, when the road surface has a gradient, the reception of a radar wave is changed according to the gradient of the road surface and the like. In the first embodiment, the gradient of the road surface and the like can be determined based on the roadside object information. Thus, by estimating the vertical axis deviation based on the roadside object information having the characteristics described above and the road surface information, it is possible to more accurately estimate the vertical axis deviation than when the vertical axis deviation is estimated merely using the road surface information.

Furthermore, by estimating the vertical axis deviation based on the roadside object information and the road surface information, it is possible to more stably estimate the vertical axis deviation, improving the robustness.

(1b) In the first embodiment, for a roadside object point group including a plurality of reflection points on the roadside object in the vertical plane, the reliability of estimation of the second vertical axis deviation angle θpb using the road surface information is changed according to the position of the inflection point of the roadside object point group.

That is, when the inflection point of the roadside object point group is located near the vehicle, the reliability of the second vertical axis deviation angle θpb is presumably lower than when the inflection point of the roadside object point group is located away from the vehicle. Thus, as in the first embodiment, by changing the reliability of estimation of the second vertical axis deviation angle θpb according to the position of the inflection point, it is possible to prevent erroneous adjustment of the vertical axis deviation angle θp and erroneous diagnosis.

(1c) In the first embodiment, the vertical axis deviation angle θp is estimated when the own vehicle VH is traveling in a straight line.

That is, the vertical axis deviation angle θp is estimated when the condition that allows accurate estimation of the vertical axis deviation angle θp is satisfied; thus, it is possible to stably obtain the vertical axis deviation angle θp with high accuracy.

1-6. Correspondence Between Terms

In a relationship between the first embodiment and the present disclosure, the vehicle VH corresponds to a moving object, the radar device 3 corresponds to a radar device, the control device 5 corresponds to an axis deviation estimation device, the object information acquisition unit 31 corresponds to an object information acquisition unit, the roadside object extraction unit 33 corresponds to a roadside object extraction unit, the road surface extraction unit 35 corresponds to a road surface extraction unit, and the axis deviation angle estimation unit 37 corresponds to an axis deviation angle estimation unit.

2. Second Embodiment

A second embodiment has the same basic configuration as the first embodiment, and thus differences from the first embodiment will be mainly described below. In the second embodiment, the same reference numerals as in the first embodiment denote the same components, and the preceding description will be referred to.

In the second embodiment, when the first vertical axis deviation angle θpa is estimated using the roadside object information and the second vertical axis deviation angle θpb is estimated using the road surface information, and the reliability of estimation of one of the vertical axis deviation angles θp is a predetermined value or less, the reliability of estimation of the other vertical axis deviation angle θp is reduced.

The state of a road surface and the state of a roadside object are presumably related to each other. For example, when the road surface is undulated, the roadside object presumably has a height varying in a similar manner. Thus, the reliability of estimation of the first vertical axis deviation angle θpa and the reliability of estimation of the second vertical axis deviation angle θpb are also presumably highly related to each other.

In the second embodiment, therefore, when the reliability of estimation of one of the vertical axis deviation angles θp, that is, one of the first vertical axis deviation angle θpa and the second vertical axis deviation angle θpb, is a predetermined value or less, the reliability of estimation of the other vertical axis deviation angle θp is reduced.

The process will be specifically described below.

Assume, for example, that the reliability of the first vertical axis deviation angle θpa is set according to a distribution state of reflection points on the roadside object, the number of reflection points, a distance to the inflection point, and the like. For example, the reliability of the first vertical axis deviation angle θpa can be set to a predetermined reliability based on a determination that when the degree of variation in position of the reflection points is less than a predetermined value, when the number of reflection points is greater than a predetermined value, and when the distance to the inflection point is greater than a predetermined value, the reliability of each parameter is higher than when the degree of variation in position of the reflection points is a predetermined value or more, when the number of reflection points is a predetermined value or less, and when the distance to the inflection point is a predetermined value or less. For example, by setting a reliability as a reference indicating a preset preferable reliability to 1, a coefficient with respect to the reference can be set. The coefficient of reliability can be set according to the degree of deviation from the corresponding predetermined value.

Thus, the reliability of the first vertical axis deviation angle θpa can be set from the reliability (e.g., the coefficient) of each parameter. The reliability of the first vertical axis deviation angle θpa can be set, for example, by calculation of the coefficient of each parameter. The calculation may be addition, integration, or the like of the coefficients.

The same applies to the case where the reliability of the second vertical axis deviation angle θpb is set according to a distribution state of reflection points on the road surface, the number of reflection points, a distance to the inflection point, and the like. That is, the reliability of the second vertical axis deviation angle θpb can be set to a predetermined reliability based on a determination that when the degree of variation in position of the reflection points is less than a predetermined value, when the number of reflection points is greater than a predetermined value, and when the distance to the inflection point is greater than a predetermined value, the reliability (e.g., the coefficient) of each parameter is higher than when the degree of variation in position of the reflection points is a predetermined value or more, when the number of reflection points is a predetermined value or less, and when the distance to the inflection point is a predetermined value or less. For example, a coefficient of reliability as a reference can be set. The coefficient of reliability can be set according to the degree of deviation from the corresponding predetermined value.

The reliability of the third vertical axis deviation angle θpz can be set from the reliability of the first vertical axis deviation angle θpa and the reliability of the second vertical axis deviation angle θpb. For example, by calculation using a weighted average set in advance or the like, the reliability of the third vertical axis deviation angle θpz can be set from the reliability of the first vertical axis deviation angle θpa and the reliability of the second vertical axis deviation angle θpb.

Furthermore, when the reliability of the third vertical axis deviation angle θpz is lower than a determination value set in advance, based on a determination that the reliability of estimation of the third vertical axis deviation angle θpz is low, as described later, the main routine in FIG. 12 may be ended without performing the processes in S160 to S190 shown in FIG. 12.

Next, the process performed in the second embodiment will be described with reference to FIG. 20. This process can be performed, for example, after the process in S150 shown in FIG. 12.

Figure 20:
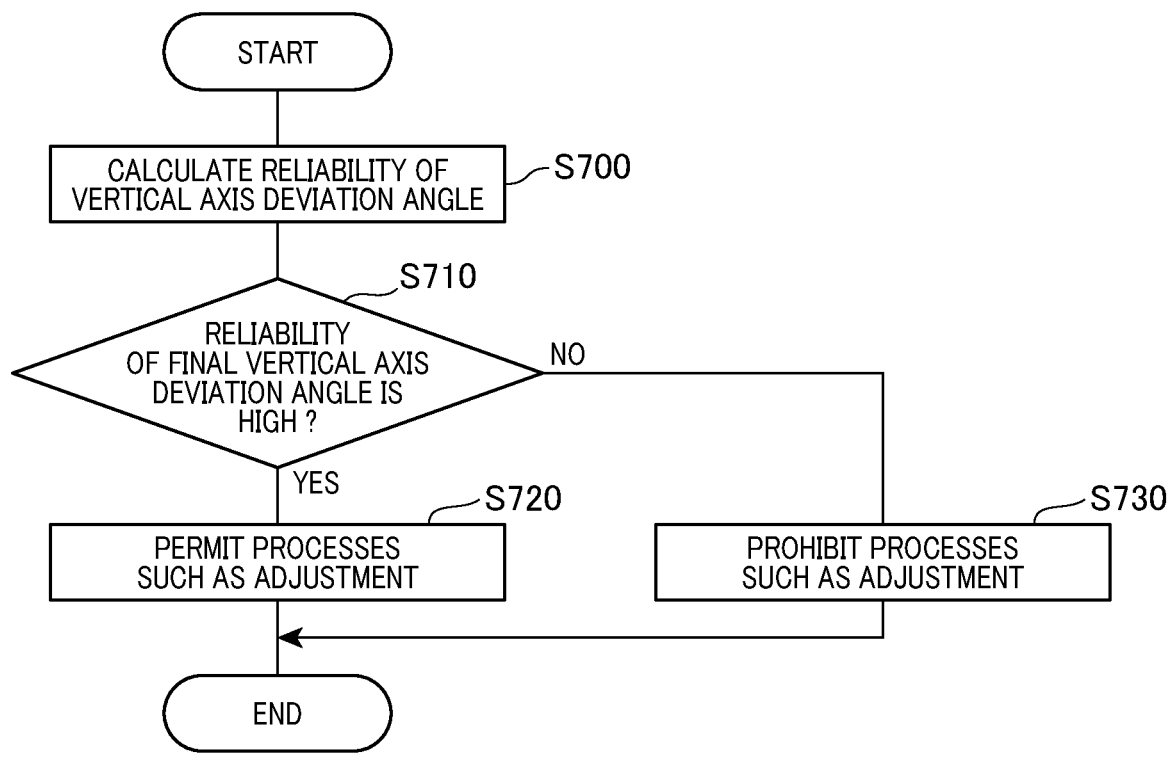

In S700 shown in FIG. 20, as described above, the reliability of the first vertical axis deviation angle θpa and the reliability of the second vertical axis deviation angle θpb are obtained, and from the reliability of the first vertical axis deviation angle θpa and the reliability of the second vertical axis deviation angle θpb, the reliability of the third vertical axis deviation angle θpz is obtained.

In subsequent S710, it is determined whether the reliability of the third vertical axis deviation angle θpz is high (i.e., a predetermined value or more) enough to perform adjustment of the vertical axis deviation (described later). In this step, in response to an affirmative determination, control proceeds to S720, and in response to a negative determination, control proceeds to S730.

In S720, since the reliability of the third vertical axis deviation angle θpz is high, the subsequent processes S160 to S190 in FIG. 12 are permitted, and the process is temporarily ended.

On the other hand, in S730, since the reliability of the third vertical axis deviation angle θpz is low, the subsequent processes S160 to S190 in FIG. 12 are prohibited, and the process is temporarily ended.

The second embodiment provides the same effects as the first embodiment. Furthermore, in the second embodiment, the reliabilities of the first vertical axis deviation angle θpa, the second vertical axis deviation angle θpb, and the third vertical axis deviation angle θpz are taken into consideration, thus preventing erroneous adjustment of the vertical axis deviation and erroneous diagnosis output based on an erroneous vertical axis deviation angle θp. This increases the reliability of the process performed by the control device 5, improving the robustness.

3. Third Embodiment

A third embodiment has the same basic configuration as the first embodiment, and thus differences from the first embodiment will be mainly described below. In the third embodiment, the same reference numerals as in the first embodiment denote the same components, and the preceding description will be referred to.

In the third embodiment, when the degree of variation in position of a plurality of reflection points on the roadside object in the vertical plane is a predetermined value or more, the reliability of estimation of the first vertical axis deviation angle θpa using the roadside object information and the reliability of estimation of the second vertical axis deviation angle θ*pb* using the road surface information are both reduced.

As described above, the state of a road surface and the state of a roadside object are presumably related to each other. Thus, the reliability of estimation of the first vertical axis deviation angle θpa and the reliability of estimation of the second vertical axis deviation angle θ*pb* are also presumably highly related to each other.

In the third embodiment, therefore, when the degree of variation in position of reflection points of a reflection point group on the roadside object, specifically, reflection points of a roadside object point group, in the vertical plane is a predetermined value or more, for example, when a correlation coefficient in the X coordinate and the Y coordinate is a predetermined value or less, the reliability of estimation of the first vertical axis deviation angle θpa and the reliability of estimation of the second vertical axis deviation angle θpb are both reduced.

The reliability (e.g., the coefficient) has the same meaning as in the second embodiment, and thus will not be described.

Next, the process performed in the third embodiment will be described. The procedure of the process performed in the third embodiment is approximately the same as in the second embodiment, and thus will be briefly described with reference to FIG. 20.

In S700 shown in FIG. 20, as described above, the reliability of the first vertical axis deviation angle θpa and the reliability of the second vertical axis deviation angle θpb are obtained, and from the reliability of the first vertical axis deviation angle θpa and the reliability of the second vertical axis deviation angle θpb, the reliability of the third vertical axis deviation angle θpz is obtained.

In subsequent S710, it is determined whether the reliability of the third vertical axis deviation angle θpz is a predetermined value or more. In this step, in response to an affirmative determination, control proceeds to S720, and in response to a negative determination, control proceeds to S730.

In S720, the subsequent processes S160 to S190 in FIG. 12 are permitted, and the process is temporarily ended. On the other hand, in S730, the subsequent processes S160 to S190 in FIG. 12 are prohibited, and the process is temporarily ended.

The third embodiment provides the same effects as the first embodiment. Furthermore, in the third embodiment, the reliabilities of the first vertical axis deviation angle θpa, the second vertical axis deviation angle θpb, and the third vertical axis deviation angle θpz are taken into consideration, thus preventing erroneous adjustment of the vertical axis deviation and erroneous diagnosis output based on an erroneous vertical axis deviation angle θp. This increases the reliability of the process performed by the control device 5, improving the robustness.

4. Fourth Embodiment

A fourth embodiment has the same basic configuration as the first embodiment, and thus differences from the first embodiment will be mainly described below. In the fourth embodiment, the same reference numerals as in the first embodiment denote the same components, and the preceding description will be referred to.

In the fourth embodiment, when map information indicating a travel path in which the own vehicle VH travels and an area around the travel path includes information on a position of a roadside object such as the guardrail 41, the map information is used, for example, to extract reflection object information indicating roadside object information.

Figure 21:
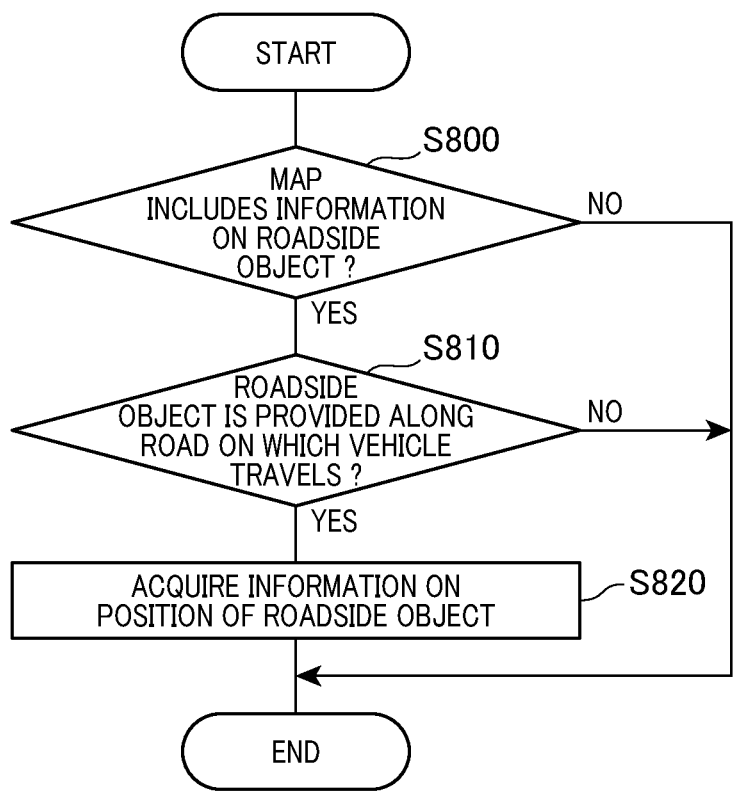
FIG. 21 is a flow chart showing a process in a fourth embodiment.

For example, as shown in FIG. 21, in S800, the control device 5 determines whether the navigation device 17 uses a map including a position of a roadside object such as the guardrail 41.

In response to a determination that the navigation device 17 uses the map including a position of a roadside object, in S810, based on information in the map and information on a position of the own vehicle VH, it is determined whether a roadside object such as the guardrail 41 is provided along the road on which the own vehicle VH travels. In response to a determination that a roadside object is provided along the road, in S820, information on a position of the roadside object with respect to the own vehicle VH is acquired, for example, information on a region in which the roadside object is located in a plane is acquired.

When no roadside object is provided along the road, there is no roadside object required to estimate an axis deviation; thus, various processes required to estimate the axis deviation may not be performed.

The process in FIG. 21 can be performed, for example, before the roadside object candidate point extraction process shown in FIG. 13. The information on the region in which the roadside object is located that is obtained from the map information can be used, for example, before or after the process in any of the steps S200 to S240. Specifically, before or after the process in any of the steps S200 to S240, a process for narrowing the range of roadside object candidate points may be performed using, as a determination condition for the narrowing process, the information on the region in which the roadside object is located that is obtained from the map information.

Thus, the process described above provides, based on the map information, information on a position of a roadside object and a region in which the roadside object is located. When a roadside object is actually detected by the radar device 3, therefore, the use of the map information enables accurate extraction of a roadside object. This makes it possible to more accurately estimate the vertical axis deviation angle θp.

The fourth embodiment also provides the same effects as the first embodiment.

5. Fifth Embodiment

A fifth embodiment has the same basic configuration as the first embodiment, and thus differences from the first embodiment will be mainly described below. In the fifth embodiment, the same reference numerals as in the first embodiment denote the same components, and the preceding description will be referred to.

In the fifth embodiment, as shown in FIG. 1, a front radar device 3a and a side radar device 3b are provided as the radar device 3. The front radar device 3a detects an object (i.e., reflection object) in the forward direction which is the direction of travel of the own vehicle VH. The side radar device 3b detects an object (i.e., reflection object) beside the own vehicle VH.

In the fifth embodiment, the vertical axis deviation angle θp is estimated when the front radar device 3a and the side radar device 3b are capable of detecting a roadside object.

Specifically, for example, as shown in FIG. 22, in the case where it is determined in S900 that the front radar device 3a has detected a roadside object and it is determined in S910 that the side radar device 3b has detected the roadside object, in S920, the control device 5 may permit estimation of the vertical axis deviation angle θp.

The process in FIG. 22 can be performed, for example, after the roadside object candidate point extraction process or the roadside object point group extraction process is performed by the radar devices 3a and 3b.

Finally, the vertical axis deviation angle θp can be estimated using the reflection point information obtained by the front radar device 3a.

Thus, a roadside object is reliably determined, and this makes it possible to obtain the vertical axis deviation angle θp with high accuracy.

The fifth embodiment also provides the same effects as the first embodiment.

6. Other Embodiments

The embodiments of the present disclosure have been described above. However, the present disclosure is not limited to the embodiments described above, and can be variously modified.

(6a) The radar device of the present disclosure is not limited to a radar device capable of detecting a roadside object in the forward direction of the own vehicle (i.e., in front of the own vehicle). The radar device of the present disclosure may be a radar device capable of detecting a roadside object in any direction including a roadside object behind the own vehicle, a roadside object in the front-side direction (e.g., diagonally left in front or diagonally right in front) of the own vehicle, and a roadside object beside (e.g., on the left side or right side of) the own vehicle. That is, the radar device of the present disclosure is not particularly limited as long as the radar device is capable of detecting a roadside object such as a guardrail.

Of the radar devices described above, at least two or more types of radar devices may be combined. For example, the vertical axis deviation angle may be estimated by selecting, among the radar devices, a radar device that has detected a roadside object, and using reflection object information obtained by the radar device.

(6b) The radar device of the present disclosure may not necessarily be an FMCW radar device as described above, and may be various radar devices such as a 2FCW radar device, an FCM radar device, or a pulse radar device. 2FCW is an abbreviation for Two-Frequency Modulated Continuous Wave, and FCM is an abbreviation for Fast-Chirp Modulation.

(6c) In the above embodiments, data obtained by the radar device is transmitted to the control device (e.g., the axis deviation estimation device) to perform processing of the data (e.g., the axis deviation estimation process). However, the radar device may perform processing of the data (e.g., the axis deviation estimation process performed by the axis deviation estimation device). The data may be processed by the sensors of the in-vehicle sensor group. Alternatively, data obtained by the sensors may be transmitted to the control device or the like, and the control device may perform various processes.

(6d) The roadside object may not necessarily be a protective fence, and may be, for example, a plurality of blocks arranged in a direction in which the road extends, or a plurality of poles dividing a lane or the like. Furthermore, the protective fence may be, for example, various vehicle protective fences or pedestrian/bicycle protective fences such as a guardrail, a guide pipe, a guide cable, or a box beam.

The roadside object may be, for example, a roadside object composed of a plurality of structures such as a plurality of blocks or a plurality of poles as described above, or a roadside object composed of a single integrated structure. The roadside object may be, for example, various protective fences or concrete side walls that are continuously and integrally provided over a long distance in a direction in which the road extends.

(6e) The control device and the method thereof described in the present disclosure may be implemented by a dedicated computer provided by configuring a processor and a memory programmed to execute one or more functions embodied by a computer program.

Alternatively, the control device and the method thereof described in the present disclosure may be implemented by a dedicated computer provided by configuring a processor with one or more dedicated hardware logic circuits.

Alternatively, the control device and the method thereof described in the present disclosure may be implemented by one or more dedicated computers configured by combining a processor and a memory programmed to execute one or more functions and a processor configured by one or more hardware logic circuits.

The computer program may be stored as instructions executed by a computer in a non-transitory tangible computer-readable storage medium. The method for implementing the functions of the components of the control device may not necessarily include software, and all the functions may be implemented by one or more pieces of hardware.

(6f) In the above embodiments, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, part of the configuration of the above embodiments may be omitted. Furthermore, at least part of the configuration of the above embodiments may be added to or replaced with another configuration of the above embodiments.

(6g) Other than the control device described above, the present disclosure may also be implemented in various forms such as a system including the control device as a component, a program for causing a computer to function as the control device, a non-transitory tangible storage medium such as a semiconductor memory in which the program is recorded, and a control method.

What is claimed is:

1. A radar device including an axis deviation estimation device for estimating an axis deviation of the radar device when the radar device is mounted on a moving object, the radar device comprising:
    an object information acquisition unit configured to repeatedly acquire object information including an object distance and an object azimuth angle, the object distance being a distance between the radar device and a reflection object corresponding to a reflection point of a radar wave that is detected by the radar device, the object azimuth angle being an azimuth angle at which the reflection object is located;
    a roadside object extraction unit configured to extract roadside object information from the object information based on a predetermined extraction condition, the roadside object information being information on the reflection point on a roadside object provided in accordance with a predetermined condition on a side of a travel path at a higher position than the travel path in a direction in which the travel path extends, the travel path being a path in which the moving object travels;
    a road surface extraction unit configured to extract road surface information from the object information based on a predetermined extraction condition, the road surface information being information on the reflection point on a road surface of the travel path in which the moving object travels; and
    an axis deviation angle estimation unit configured to estimate a vertical axis deviation angle based on the roadside object information including information on a plurality of the reflection points on the roadside object and the road surface information including information on a plurality of the reflection points on the road surface, the vertical axis deviation angle being an angle of deviation of an actual mounting direction from a reference mounting direction in a vertical direction, the actual mounting direction being an actual direction of the radar device, the reference mounting direction being a direction of the radar device when the radar device is mounted in a reference state.

2. The radar device according to claim 1, wherein
the axis deviation angle estimation unit is configured to change a reliability of estimation of the vertical axis deviation angle using the road surface information, according to a position of an inflection point of a roadside object point group including the plurality of reflection points on the roadside object in a vertical plane, the inflection point indicating a position at which the plurality of reflection points of the roadside object point group distributed in the vertical plane are arranged discontinuously.

3. The radar device according to claim 1, wherein
the axis deviation angle estimation unit is configured to approximate, by a roadside object straight line, the plurality of reflection points on the roadside object that are arranged in a vertical plane and to estimate the vertical axis deviation angle using the roadside object straight line.

4. The radar device according to claim 1, wherein
the axis deviation angle estimation unit is configured to approximate, by a road surface straight line, the plurality of reflection points on the road surface that are arranged in a vertical plane and to estimate the vertical axis deviation angle using the road surface straight line.

5. The radar device according to claim 1, wherein
the axis deviation angle estimation unit is configured such that when the axis deviation angle estimation unit estimates the vertical axis deviation angle using the roadside object information and estimates the vertical axis deviation angle using the road surface information, and one of a reliability of estimation of the vertical axis deviation angle using the roadside object information and a reliability of estimation of the vertical axis deviation angle using the road surface information is a predetermined value or less, the axis deviation angle estimation unit reduces the other one of the reliability of estimation of the vertical axis deviation angle using the roadside object information and the reliability of estimation of the vertical axis deviation angle using the road surface information.

6. The radar device according to claim 1, wherein
the axis deviation angle estimation unit is configured such that when the axis deviation angle estimation unit estimates the vertical axis deviation angle using the roadside object information and estimates the vertical axis deviation angle using the road surface information, and a degree of variation in position of the plurality of reflection points on the roadside object in a vertical plane is a predetermined value or more, the axis deviation angle estimation unit reduces both a reliability of estimation of the vertical axis deviation angle using the roadside object information and a reliability of estimation of the vertical axis deviation angle using the road surface information.

7. The radar device according to claim 1, wherein
the vertical axis deviation angle is estimated when the moving object is traveling in a straight line.

8. The radar device according to claim 1, wherein
when map information indicating the travel path and an area around the travel path includes information on a position of the roadside object, the map information is used to extract the roadside object information.

9. The radar device according to claim 1, wherein
the vertical axis deviation angle is estimated when the radar device includes a front radar device for detecting a reflection object in a forward direction which is a direction of travel of the moving object, and a side radar device for detecting a reflection object beside the moving object, and the front radar device and the side radar device are capable of detecting the roadside object.

* * * * *